(12) United States Patent
Narita et al.

(10) Patent No.: US 7,590,948 B2
(45) Date of Patent: Sep. 15, 2009

(54) DISPLAY INFORMATION SELECTION APPARATUS AND METHOD, PROGRAM AND RECORDING MEDIUM

(75) Inventors: Ken Narita, Tokyo (JP); Hitoshi Imai, Tokyo (JP); Tadashi Tsushima, Yokohama (JP); Satoshi Nakajima, Redmond, WA (US)

(73) Assignee: Kabushiki Kaisha Square Enix, Tokyo (JP)

( * ) Notice: Subject to any disclaimer, the term of this patent is extended or adjusted under 35 U.S.C. 154(b) by 302 days.

(21) Appl. No.: 11/553,597

(22) Filed: Oct. 27, 2006

(65) Prior Publication Data
US 2007/0106949 A1    May 10, 2007

(30) Foreign Application Priority Data
Oct. 28, 2005    (JP)    ............................ P2005-315005

(51) Int. Cl.
*G06F 15/00*    (2006.01)
*G06F 13/00*    (2006.01)
(52) U.S. Cl. ...................................... 715/810; 715/852
(58) Field of Classification Search ................. 715/810, 715/811, 764–768, 825–828, 808, 851–853
See application file for complete search history.

(56) References Cited

U.S. PATENT DOCUMENTS

| 5,596,699 | A | * | 1/1997 | Driskell ........................ 715/834 |
| 5,689,667 | A | * | 11/1997 | Kurtenbach .................. 715/810 |
| 6,414,700 | B1 | * | 7/2002 | Kurtenbach et al. ......... 715/810 |
| 7,246,329 | B1 | * | 7/2007 | Miura et al. .................. 715/810 |

FOREIGN PATENT DOCUMENTS

| JP | 9-259130 A | 10/1997 |
| JP | 10-207907 A | 8/1998 |
| JP | 11-219369 A | 8/1999 |
| JP | 2000-076279 A | 3/2000 |
| JP | 2004-259040 | 9/2004 |

OTHER PUBLICATIONS

U.S. Appl. No. 11/553,669 to Narita et al., which was filed on Oct. 27, 2006.
English language Abstract of JP 2004-259040.
English language Abstract of JP 2000-076279 A, Mar. 14, 2000.
English language Abstract of JP 10-207907 A, Aug. 7, 1998.
English language Abstract of JP 11-219369 A, Aug. 10, 1999.
English language Abstract of JP 9-259130 A, Oct. 3, 1997.

* cited by examiner

*Primary Examiner*—Kevin Nguyen
(74) *Attorney, Agent, or Firm*—Greenblum & Bernstein, P.L.C.

(57) ABSTRACT

In a display device, information related to specified information, which is displayed large in a center portion of a display, by a selected relation criterion is displayed aligned on a selection axis, while information related by other relation criteria is displayed aligned on non-selection axes. Information selected as the specified information can be sequentially changed in accordance with an input from an up or down direction key, and a relation criterion of information displayed on the selection axis and the non-selection axes can be sequentially changed in accordance with an input from a left or right direction key. Also, in accordance with an input from an X button, an immediately preceding input from a direction key is cancelled, and a display condition returns to an immediately preceding history. In accordance with an input from a Δ button, a display condition previously bookmarked by an input from a □ button is displayed.

20 Claims, 11 Drawing Sheets

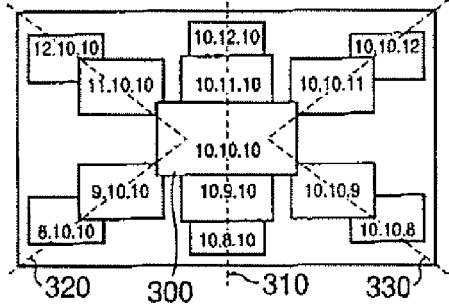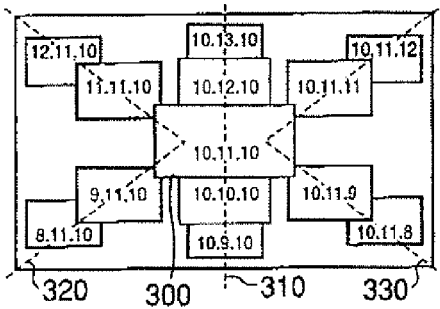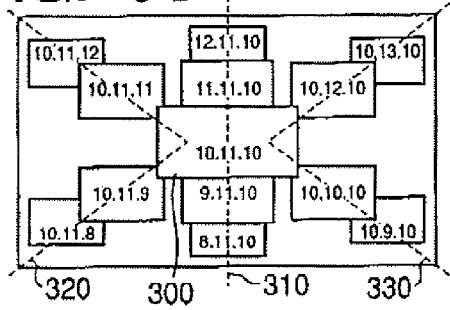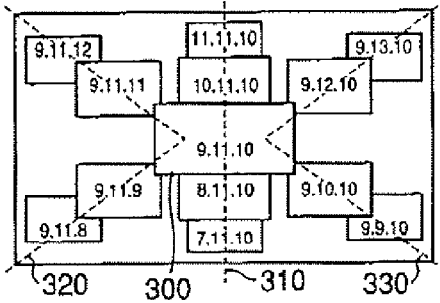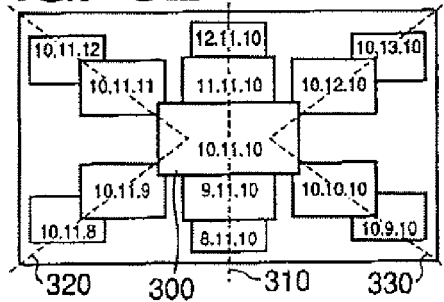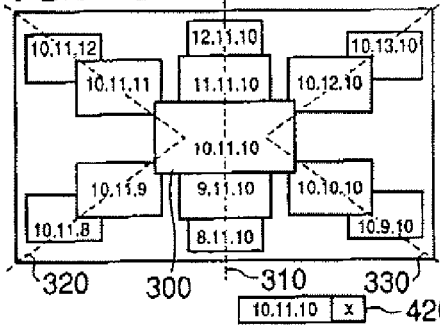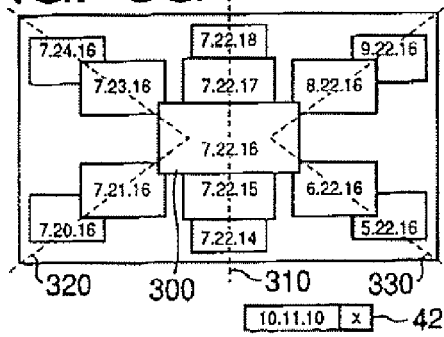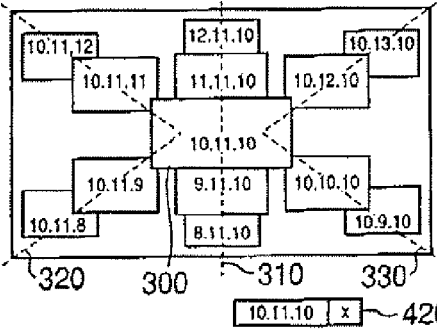

| 10:00 TO 16:00 SUNDAY, DATE | | | | |
|---|---|---|---|---|
| | CHANNEL 1 | CHANNEL 2 | ------ | CHANNEL 12 |
| 10:00 | 00 DRAMA | 00 CARTOON | | 00 CARTOON |
| | | 30 CURRENT AFFAIRS SPECIAL | | 00 CARTOON |
| 11:00 | 00 TRAVEL INFORMATION | | ------ | 00 NEWS |
| | 30 NEWS | 30 NEWS PRESENTER: ××TARO | | 45 FOREIGN SOCCER |
| 12:00 | 00 MUSIC PROGRAM | 00 COMEDY | ------ | |
| | | 45 QUIZ | | |

DISPLAY INFORMATION SELECTION APPARATUS AND METHOD, PROGRAM AND RECORDING MEDIUM

CROSS REFERENCE TO RELATED APPLICATION

The present disclosure relates to subject matter contained in Japanese Patent Application No. 2005-315005, filed on Oct. 28, 2005, the disclosure of which is expressly incorporated herein by reference in its entirety.

BACKGROUND OF THE INVENTION

1. Field of the Invention

The present invention relates to a technology for selectively displaying a plurality of items of information on a display device, which items of information relate with one another via different respective ones of one or more relation criteria.

2. Description of the Related Art

In recent years, along with a spread of information terminals such as, for example, personal computers (hereafter referred to as "PCs"), portable terminals such as portable telephones and PDAs (Personal Data Assistants), and digital household electrical appliances such as car navigation systems and television program recorders, opportunities are increasing for a user to select various types of information that may be displayed on a display device of an information terminal in order to carry out a desired process. To date, only information held in a specified system has normally been provided. However, in recent years, because of progress in network technology, and a spread of network technology such as, for example, the Internet, it has become possible to provide information not only in a local area, but also from a server located in a remote place.

Also, along with development of a communication environment such as, for example, a broadband network, it has become possible to use not only small volumes of static image data, but also large volumes of moving image data or music data. For this reason, as a huge amount of information now exists on the network, it has become difficult for a user to select desired information. Accordingly, search functions such as, for example, a keyword search or a directory search have been used as an information retrieval and/or selection method.

However, these search functions require a user to specify in advance keyword information for a target of search. For this reason, these search functions may not provide a sufficient display of search results to a user who has a vague browsing objective and needs information that match a passing whim. Japanese Unexamined Patent Publication No. 2004-259040 provides an information display method that enables a user to visually evaluate and select information displayed on a display device (Paragraph 0009).

However, the method for displaying information in response to a user's intention described in JP-A-2004-259040 merely provides an n-dimensional space (contents space) in accordance with an information keyword (thumbnail information) for each item of information (contents), and arranging the keyword (thumbnail information) in the space. In short, it does not enable a user to visually select desired information.

Also, information that the user desires may not always be specified by keywords. The user, when acquiring specified information, may also wish to acquire new information that relates to the specified information. For example, a typical user may have had the experience of noticing a certain item while shopping, and therefrom looking for an item that closer matches the user's image of a desired item. Net-surfing involves browsing for information in much the same way as the shopping behavior pattern just described. However, net-surfing has not been a means for a user to visually search for desired information. The same can be said not only for information on a network, but also for information in a database provided in a single information processing device.

SUMMARY OF THE INVENTION

The present invention is made in view of at least these problems. It is an object of the present invention to provide an apparatus, a method, a program and a recording medium for selecting display information, which enable a user to visually select desired information, without difficulty, from among a plurality of items of information, which relate to one another in a complicated manner, and to display the selected item on a display.

In order to achieve the object, according to a first aspect of the invention, there is provided a display information selection apparatus for selectively displaying a plurality of items of information on a display in accordance with an input from an input device, including at least a first input and a second input. The items of information relate to one another via at least one relation criteria for different respective ones of the relation criteria. The apparatus includes a specified information displayer that displays specified information in a specified position on the display. The specified information is optionally selected from among the plurality of items of information. The apparatus further includes a selectable information displayer that displays selectable other items of information, relating to the specified information via a selected relation criterion selected from among the relation criteria that relate the other items of information to the specified information. The selectable other items of information are aligned on a selection axis set on the display with the specified position as a reference. The apparatus further includes a non-selectable information displayer that displays other non-selected items of information relating to the specified information via another relation criterion, other than the selected relation criterion. The non-selected items of information are aligned on a non-selection axis set on the display beside the selection axis with the specified position as a reference. The apparatus further includes a specified information changing system that changes a selection of the specified information to another item of information displayed adjacent to the specified information on the selection axis in accordance with an input from the first input. The apparatus further includes a selected criterion changing system that changes a selection of the selected relation criterion to another relation criterion of the relation criteria that relate the specified information to the other items of information in accordance with an input from the second input.

The selection axis and the non-selection axis are not necessarily recognized as such by the display information selection apparatus, but they are necessarily recognized by the user. For example, in the selectable information displayer according to an aspect of the invention, it is also acceptable that an axis recognized by the user as what passes through an area displaying each of the selectable other items of information, which relate to the specified information via the selected relation criteria, serves as the selection axis. The same applies to the non-selection axis.

In the display information selection apparatus, the specified information is displayed in a specified position on the display, while other information relating to the specified information is displayed in another position, other than the specified position on the display. Herein, the specified information relates to the other information via one or more relation criteria, and one of the relation criteria is selected as a selected relation criterion. The other information relating to the specified information via the selected relation criterion is displayed aligned on the selection axis. Other information relating to the specified information via another relation criterion, other than the selected relation criterion is displayed aligned on the non-selection axis.

Herein, it is possible to make the other information related via the selected relation criterion to be the new specified information in accordance with an input from the first input. By carrying out an input from the first input again while the new specified information is displayed in a specified position, it is further possible to make another, different item of information related via the same relation criterion (the selected relation criterion) the latest specified information. By repeating an input from the first input in this way, it is possible to sequentially display other items of information related via the same relation criterion (the selected relation criterion) corresponding to the information previously selected as the specified information, in the specified position on the display.

Also, non-selected other items of information, relating to the specified information via another relation criterion, other than the selected relation criterion, are also displayed on the non-selection axis. In the event that a user gets interested in the non-selected other information displayed on the non-selection axis, the user may carry out an input from the second input to change a relation criterion which has not been the selected relation criterion to the selected relation criterion. By combining the input from the second input and the input from the first input, it is possible for the user to visually compare the information to reach the desired information beginning at the information selected as the specified information at a certain point.

In this way, the user, by considering the specified information, which is displayed in the specified position of display, can visually perceive the other items of information relating thereto and relation criteria associating with the other items of information. Then, by sequentially changing the specified information and the selected relation criterion by manipulating the inputs from the first and second inputs, it becomes possible to easily select the desired information, by a visual perception method, even from among a plurality of items of information intricately relating to one another.

In the display information selection apparatus, the specified information displayer may display the specified information larger than the other items of information that are displayed.

In this case, the information selected as the specified information at any time is easier for the user to visually perceive and understand than the other information.

In the display information selection apparatus, the selectable information displayer may display the selectable other items of information, other than the specified information relating to the specified information via the selected relation criterion, larger than the non-selected other items of information relating to the specified information via the other relation criterion other than the selected relation criterion.

In this case, it becomes easier for the user to visually perceive whether another item of information, other than the specified information, is related to the present specified information via the selected relation criterion so that it can be made the new specified information in response to an input from the first input; or, whether it is related to the present specified information via another relation criterion, other than the selected relation criterion, so that it cannot be made the new specified information in response to an input from the first input.

In the display information selection apparatus, the selectable information displayer may display the selectable other items of information, other than the specified information, relating to the specified information via the selected relation criterion, adjacent to the specified information and larger in scale than the non-selected other items of information not displayed adjacent to the specified information.

The non-selectable information displayer may display the non-selected other items of information, other than the specified information and relating to the specified information via the other relation criterion, which are other than the selected relation criterion and displayed adjacent to the specified information larger than the other items of information, as not displayed adjacent to the specified information.

The selectable information displayer may display selectable other items of information relating to the specified information via the selected relation criterion so that the closer the items are displayed to the specified information, the larger they are displayed. The non-selectable information displayer may also display non-selected other items of information relating to the specified information via the other relation criterion, other than the selected relation criterion, so that the closer the items are displayed to the specified information, the larger they are displayed.

By displaying the information displayed adjacent to the specified information larger than the information not displayed adjacent to the specified information, or by displaying information larger the closer it is displayed to the specified information, it becomes easier for the user to visually perceive other information which can be made or selected to be the specified information after the present specified information, making it even easier to carry out a selection of information.

In the display information selection apparatus, the selectable information displayer may display an item of information having a closest similarity to the specified information adjacent to the specified information from among the other items of information relating to the specified information via the selected relation criterion.

The non-selectable information displayer may display an item of information having a closest similarity to the specified information adjacent to the specified information from among the other items of information relating to the specified information via another relation criterion, other than the selected relation criterion.

Also, the selectable information displayer may display selectable other items of information relating to the specified information via the selected relation criterion so that the more similar to the specified information the other items of information are, the closer to the specified information they are displayed. The non-selectable information displayer may also display non-selected other items of information relating to the specified information via another relation criterion, other than the selected relation criterion, so that the more similar to the specified information the other items of information are, the closer to the specified information they are displayed.

Thus, by displaying the items of information with the closest similarity to the specified information adjacent to the specified information, or the more similar they are to the specified information, the closer they are displayed to the specified information, even when they relate to one another via the same relation criterion, it becomes easier for a user to visually comprehend how to select the new specified information in order to reach the desired information from the present specified information.

In the display information selection apparatus, the selectable information displayer may display a predetermined number of items of information, from among the other items of information relating to the specified information via the selected relation criterion, aligned on the selection axis.

In this case, the non-selectable information displayer may display a predetermined number of items of information, or fewer, from among the other items information relating to the specified information via the other relation criterion, other than the selected relation criterion, aligned on the non-selection axis.

By thus limiting a number of other items of information, other than the specified information displayed aligned on selection axis and non-selection axis, a size of display of the other items of information, other than the specified information, on the display is prevented from becoming too small even when there are a large number of items of information relating to the specified information via different respective ones of relation criteria. Also, even in the event of limiting the number of items of information displayed aligned on selection axis and non-selection axis, as long as a fixed number of items of information are displayed, it presents no great impediment to the user in visually perceiving a relationship between the other information and the specified information. Furthermore, by making the number of items of information on the selection axis equal to or greater than the number of items of information on the non-selection axis, it becomes easier to perceive other information which can be made or selected to be the new specified information in response to an input from the first input.

In the display information selection apparatus, a number of the relation criteria, relating the items of information to respective different ones of items of information, may differ for each of the plurality of items of information. In this case, the non-selectable information displayer may include a non-selection axis setting system that sets a non-selection axis for each of the other relation criterion, other than the selected relation criteria, in accordance with a number of the relation criterion relating the specified information to the other items of information. The non-selectable information displayer may further include a relation-criterion-based displayer that displays the other items of information relating to the specified information via the other relation criterion, other than the selected relation criterion, side-by-side on the non-selection axis set for each of the other relation criterion.

In this case, non-selection axes are provided in accordance with a number of relation criteria relating the specified information to the other items of information. The other items of information are displayed on different respective ones of non-selection axes for each of the other relation criteria, other than the selected relation criterion. Thus, even when the number of relation criteria differs in accordance with the selected specified information, it becomes possible for a user to perceive the other items of information relating to the present specified information via another relation criterion, other than the selected relation criterion, for each of the relation criteria.

A non-selection axis may be set by the non-selection axis setting system so that the non-selection axis is recognized by the user as the non-selection axis, by displaying other items of information aligned with each of the relation criterion. That is, there is no necessity to recognize a process of setting the non-selection axis in the display information selection apparatus. In other words, the non-selection axis for each of relation criteria can be recognized by the user depending on the display positions of the other items of information in accordance with a difference between respective ones of relation criteria. The same applies to a case of a non-selection axis setting system in which an item of information having three or more relation criteria, relating the other items of information thereto, is made the specified information (to be described later).

In this case, the plurality of items of information may include an item of information having a single relation criterion, relating the other items of information thereto. Herein, the non-selectable information displayer may display the other items of information relating to the specified information via the other relation criterion, other than the selected relation criterion, under a condition that a number of the relation criteria relating the specified information to the other items of information is not one.

In this case, in case that there is only a single relation criterion relating the specified information to the other items of information, only the other items of information relating to the specified information via the selected relation criterion are displayed on the selection axis besides the specified information itself. Thus, it becomes easy for a user to visually understand that the presently selected specified information is related to the other items of information via only a single relation criterion.

In the display information selection apparatus, the plurality of items of information may include an item of information having three or more relation criterion relating the other items of information thereto. In this case, the non-selectable information displayer may include a non-selection axis setting system that sets two or more non-selection axes for each of the other relation criteria, other than the selected relation criterion, when a number of the relation criteria relating the information selected as the specified information to the other items of information is three or more. The non-selectable information displayer may further include a relation-criterion-based displayer that displays the other items of information relating to the specified information via the other relation criterion, other than the selected relation criterion, on the two or more non-selection axes set for each of the other relation criteria. The selected criterion changing system may sequentially change a selection of the selected relation criterion among the three or more relation criteria when there is an input from the second input.

Herein, in case that the number of relation criterion relating the specified information to other items of information is three or more, there are two or more other relation criteria, other than the relation criterion, serving as the selected relation criterion. In this case, a non-selection axis is provided for each of the other relation criteria, other than the selected relation criterion, and the other items of information associated with different respective ones of relation criteria are displayed on different respective ones of non-selection axes. Thus, even in case the number of relation criteria corresponding to the selected specified information is three or more, it becomes possible for a user to perceive other items of information relating to the present specified information via other relation criteria, other than the selected relation criterion, with respect to each of the relation criteria.

When the number of relation criteria relating the information selected as the specified information to other items of information is three or more, one or more non-selection axes may be set for one or more of the other two or more relation criteria, other than the selected relation criterion, and thereby display the other items of information associated with different respective one of relation criterion corresponding to the set non-selection axes. In this case, a non-selection axis is set for a relation criterion for which a non-selection axis is not set at a certain time, when the selected relation criterion is changed in accordance with an input from the second input. Even a relation criterion for which a non-selection axis has not been set at a certain time is eventually made selectable as the selected relation criterion in accordance with a further input from the second input.

The display information selection apparatus may further include a history storage system that causes a storage device to store information identifying a selection history of the specified information and the selected relation criterion. The display information selection apparatus may still further include a history status restoration system that changes the selection of the specified information, and the selected relation criterion to the specified information, and the selected relation criterion selected previous to the specified information and the selected relation criterion currently selected.

The history storage system may cause the storage device to store a selection condition of the specified information and the selected relation criterion. In the event that the selection history of the specified information and the selected relation criterion can be specified based on an input from the input device, the history storage system may cause the storage device to store a history of the input from the input device.

In this case, since the selection history of the specified information and the selected relation criterion have been stored, it is possible to return to a previous selection condition of the specified information and selected relation criterion in accordance with the stored history. Even when it seems that the specified information is getting away from the user's own desired information, by repeating inputs from the first input or the second input, a user may repeat a selection of the specified information and selected relation criteria again from the previous selection condition of the specified information and selected relation criteria. Thus it becomes easy for the user to select the desired information.

In the display information selection apparatus, the input device may include, in addition to the first input and the second input, a selection status saving input that carries out an input for saving a selection status of the specified information and the selected relation criterion. The input device may further include a selection status restoration input that carries out an input for restoring the saved selection status of the specified information and the selected relation criterion. In this case, the display information selection apparatus may further include a selection status storage system that causes the storage device to store an item of information identifying the specified information and the selected relation criterion currently selected when there is an input from the selection status saving input. The display information selection apparatus may further include a selection status restoration system that changes the selection of the specified information, and the selected relation criterion to the specified information, and the selected relation criterion identified by the information stored in the selection status storage system, when there is an input from the selection status restoration input.

In this case, when the user becomes interested in the selection condition of the specified information and selected relation criterion at a certain time, it is possible to record the condition and to restore the recorded selection condition at later times. Even when it seems that the specified information is getting away from the user's desired information, by repeating inputs from the first input or the second input, a user may repeat a selection of the specified information and selected relation criterion from the recorded selection condition of the specified information and selected relation criterion. Thus it becomes easy for the user to select the desired information.

In the display information selection apparatus, the first input may include a first dimensional direction input that inputs a prescribed dimensional direction of a two-dimensional coordinate system. The second input may include a second dimensional direction input that inputs another dimensional direction of the two-dimension coordinate system as the second input. In this case, the selectable information displayer may display the other items of information relating to the specified information via the selected relation criterion on the selection axis set in the first dimensional direction on the display.

Generally, as the display device displays an image in a planar coordinate system, a plurality of items of information can be only two-dimensionally arranged on a display. With a three-dimensional arrangement of items of information, it is possible to project an information relationship onto a two-dimensional plane by means of a perspective transformation, or the like, but a tridirectional input is required. On the other hand, the input device is generally only equipped with two-dimensional up/down and left/right direction input keys.

Meanwhile, according to an aspect of the invention, even in case that there are three, or four or more, relation criteria relating the specified information to other items of information, it is possible to select information in a user's desired direction with respect to the present specified information as new specified information by sequentially selecting the specified information with an input of a first dimensional direction and the selected relation criterion by an input of a second dimensional direction. For this reason, even with a display that displays an image in a two-dimensional planar coordinate system, and an input device having two-dimensional direction input keys, it becomes easily possible for the user to visually perceive a relationship between each of the items of information, from among a plurality of items of information intricately related via a relation criterion in three, or four or more dimensions, and to facilitate selection of desired information.

The first dimensional direction input may input a positive direction and a negative direction of the prescribed dimension, while the second dimensional direction input inputs a positive direction and a negative direction of the other dimensions. In this case, when there is an input of the positive direction of the prescribed dimension, the specified information changing system may change the selection of the specified information to another item of information displayed adjacent to the specified information on the selection axis in the positive direction of the prescribed dimension. Meanwhile, when there is an input of the negative direction of the prescribed dimension, the information changing system may change the selection of the specified information to another item of information displayed adjacent to the specified information on the selection axis in the negative direction of the prescribed dimension. When there is an input of the positive direction of the other dimensions, the selected criterion changing system may change the selection of the selected relation criterion to a relation criterion corresponding to a non-selection axis displayed in a position corresponding to the positive direction with respect to the selection axis. Meanwhile, when there is an input of the negative direction of the other dimensions, it changes the selection of the selected relation criterion to a relation criterion corresponding to a non-selection axis displayed in a position corresponding to the negative direction with respect to the selection axis.

In the display information selection apparatus, the input device may further include, in addition to the first input and the second input, a selection confirmation input that carries out an input for confirming a selection of the specified information. In this case, the display information selection apparatus may further include a selection processing system that carries out a process determined in accordance with the specified information when there is an input from the selection confirmation input.

Thus, by carrying out a process determined in accordance with the specified information with an input from the selection confirmation input, it becomes possible for the user to visually perceive and select a process which he or she wants to carry out.

The display information selection apparatus may further include an information extraction system that extracts information from an information storage system storing the plurality of items of information. Each of the plurality of items of information may include a plurality of items of individual information corresponding to respective different ones of relation criterion. In this case, the selectable information displayer may cause the information extraction system to extract items of information, including the individual information corresponding to the selected relation criterion, in common, and cause the display to display the extracted items of information aligned on the selection axis. The non-selectable information displayer may cause the information extraction system to extract items of information, including the individual information corresponding to the other relation criterion, other than the selected relation criterion, and cause the display to display the extracted information aligned on the non-selection axis.

The display information selection apparatus may further include an information search system that searches an information storage system for one or more relation criterion information sets, including the specified information. The relation criterion information set is a set of a plurality of items of information relating to each other via respective different ones of the relation criteria and being stored in the information storage system in association with each of the relation criteria. In this case, the selectable information displayer may display other items of information, other than the specified information included in the relation criterion information set corresponding to the selected relation criterion, from among the relation criterion information sets searched out by the information search system, aligned on the selection axis. The non-selectable information displayer may display other items of information, other than the specified information included in a relation criterion information set corresponding to the other relation criterion other than the selected relation criterion, from among the relation criterion information sets searched out by the information search system, aligned on the non-selection axis.

Herein, the information storage system may be furnished inside a computer apparatus configuring the display information selection apparatus. Also, in case the computer apparatus configuring the display information selection apparatus is connected to a network, the information storage system may be furnished inside another computer apparatus existing on the network. The information storage systems may exist dispersed on the network with respect to each of the relation criterion information sets.

The display information selection apparatus may further include an information search system that searches the information storage system that stores a plurality of items of information, each of which includes relation criterion information identifying a relation criterion relating the item of information to other items of information, for another item of information including the same relation criterion information as the relation criterion information included in the specified information with respect to each of the relation criteria. In this case, the selectable information displayer may display items of information corresponding to the selected relation criterion searched out by the information search system aligned on the selection axis. The non-selectable information displayer may display items of information corresponding to another relation criterion, other than the selected relation criterion searched out by the information search system aligned on the non-selection axis.

Here, the information storage system may be furnished inside a computer apparatus configuring the display information selection apparatus. Also, in case the computer apparatus configuring the display information selection apparatus is connected to a network, the information storage system may be furnished inside another computer apparatus existing on the network. The information storage system may exist dispersed on the network with respect to each of the relation criterion information sets.

In order to achieve the object, according to a second aspect of the present invention, there is provided a display information selection method executed in a computer apparatus that includes an input device including at least a first input and a second input and a display for displaying information. The method selectively displays a plurality of items of information on the display in accordance with an input from the input device. The items of information relate to one another via at least one relation criteria for different respective ones of the relation criteria. The method includes displaying specified information in a specified position on the display. The specified information is optionally selected from among the plurality of items of information. The method further includes displaying other items of information relating to the specified information via a selected relation criterion selected from among the relation criteria that relate the other items of information to the specified information. The selected other items of information are aligned on a selection axis set on the display with the specified position as a reference. The method further includes displaying other non-selected items of information relating to the specified information via another relation criterion, other than the selected relation criterion. The other non-selected items of information are aligned on a non-selection axis set on the display beside the selection axis with the specified position as a reference. The method further includes changing a selection of the specified information to another item of information displayed adjacent to the specified information on the selection axis in accordance with the input from the first input. The method further includes changing a selection of the selected relation criterion to another relation criterion of the relation criteria that relate the specified information to other items of information in accordance with the input from the second input.

In order to achieve the object, according to a third aspect of the present invention, there is provided a program, when executed by a computer apparatus comprising an input device including at least a first input, a second input, and a display for displaying information, that causes the computer apparatus to carry out a method of selectively displaying a plurality of items of information on the display in accordance with an input from the input device. Each of the items of information are related to another item of information via each of one or more relation criteria. The program causes the computer apparatus to display specified information in a specified position on the display. The specified information is optionally selected from among the plurality of items of information.

The program further causes the computer apparatus to display other items of information relating to the specified information via a selected relation criterion selected from among the relation criteria that relate the other items of information to the specified information. The selected other items of information are aligned on a selection axis set on the display with the specified position as a reference. The program further causes the computer apparatus to display other non-selected items of information relating to the specified information via another relation criterion, other than the selected relation criterion. The other non-selected items of information are aligned on a non-selection axis set on the display besides the selection axis with the specified position as a reference. The program further causes the computer to change a selection of the specified information to another item of information displayed adjacent to the specified information on the selection axis in accordance with an input from the first input. The program further causes the computer apparatus to change a selection of the selected relation criterion to another relation criterion of the relation criteria that relates the specified information to the other items of information in accordance with an input from the second input.

In order to achieve the object, according to a fourth aspect of the present invention, there is provided a computer readable recording medium tangibly embodying a program. The program, when executed by a computer apparatus comprising an input device including at least a first input, a second input, and a display for displaying information, causes the computer apparatus to carry out a method of selectively displaying a plurality of items of information on the display in accordance with an input from the input device. Each of the items of information are related to another item of information via each of one or more relation criteria. The program causes the computer apparatus to display specified information in a specified position on the display. The specified information is optionally selected from among the plurality of items of information. The program further causes the computer apparatus to display other items of information relating to the specified information via a selected relation criterion selected from among the relation criteria that relate the other items of information to the specified information. The selected other items of information are aligned on a selection axis set on the display with the specified position as a reference. The program further causes the computer apparatus to display other non-selected items of information relating to the specified information via another relation criterion, other than the selected relation criterion. The other non-selected items of information are aligned on a non-selection axis set on the display beside the selection axis with the specified position as a reference. The program further causes the computer to change a selection of the specified information to another item of information displayed adjacent to the specified information on the selection axis in accordance with an input from the first input. The program further causes the computer apparatus to change a selection of the selected relation criterion to another relation criterion of the relation criteria that relate the specified information to the other items of information in accordance with an input from the second input.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout the several views of the drawings:

FIGS. 6A to 6H are diagrams specifically showing a change in the display mode of the information according to the first embodiment of the invention;

DESCRIPTION OF THE PREFERRED EMBODIMENTS

Hereafter, a description will be given of embodiments of the invention, with reference to the accompanying drawings. The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodiment in practice.

First Embodiment

Figure 1:
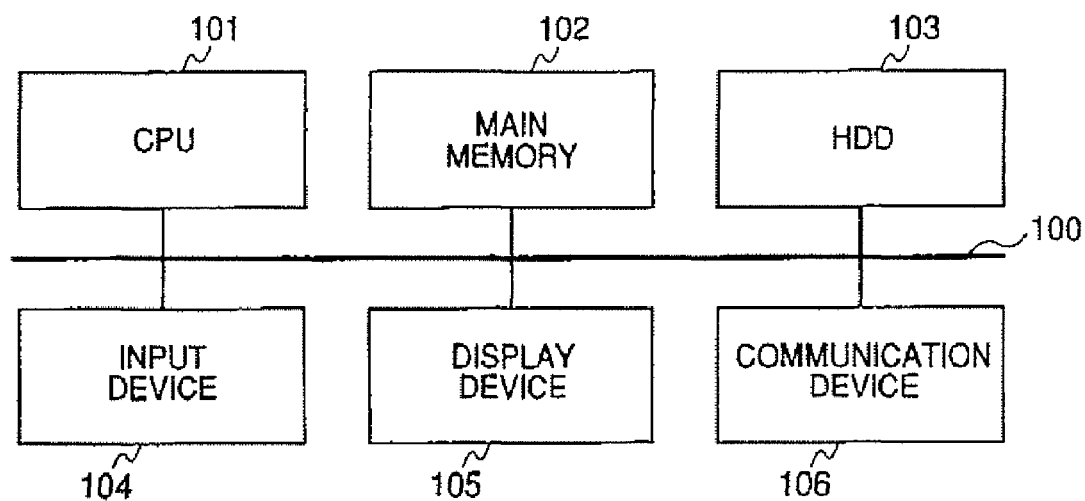
FIG. 1 is a block diagram showing a configuration of an information processing apparatus that executes a process according to a first embodiment of the invention.

FIG. 1 is a block diagram showing a configuration of an information processing apparatus according to this embodiment. As shown in the figure, the information processing apparatus in the example includes a central processing unit (CPU) 101, a main memory 102, a hard disk drive (HDD) 103, an input device 104, a display device 105 and a communication device 106. These are interconnected via a bus 100. The skilled artisan will appreciate that instead of bus 100, devices 101 to 106 may be coupled to each other via wired or wireless communication, or any combination thereof without departing from the scope and/or spirit of the invention.

The CPU 101 executes a program transferred to the main memory 102, and carries out a process such as, for example, a display of multiple items of related information to be described hereafter. The main memory 102 may be, but is not limited to a storage device such as, for example, a semiconductor memory, which provides a main storage space for the CPU 101. The HDD 103 is a storage device, which provides an auxiliary storage space for the CPU 101. Items of information to be selectively displayed on the display device 105, to be described hereafter, are stored in the HDD 103. The program to be executed by the CPU 101 is stored in the HDD 103 but, when executed, is transferred to the main memory 102 as necessary.

The input device 104 transmits an instruction from a user to the CPU 101. The input device 104 may be, but is not limited to, for example, a game pad for use in executing a computer game, a voice response interface device, a biometric interface device, or the like, which serves as an interface between the user and the CPU 101. The exemplary, non-limiting game pad may be configured in such a way as to include up, down, left and right direction keys, and four selection buttons, such as, for example, circle, X, square and triangle buttons. The circle button may be configured for carrying out an input to instruct a confirmation of specified information being displayed in a center of the display device 105. The X-button may be configured for carrying out an input to instruct a cancellation of the previous input from a direction key. The square button may be configured for carrying out an input to instruct a bookmarking of a present information display condition on the display device 105. The triangle button may be configured for carrying out an input to instruct a call up of a bookmark.

The display device 105 displays a variety of information according to a control of the CPU 101. The communication device 106 transmits and receives information to and from an external device via a communication network such as, for example, the Internet, a local area network (LAN), a wide area network (WAN), or the like, where the link to the network may be wired, wireless, or a combination of wired and wireless as the skilled artisan will readily appreciate without departing from the scope and/or spirit of the invention. The information processing apparatus according to this embodiment does not necessarily include the communication device 106.

Next, a description will be given of exemplary, non-limiting items of information that may be selectively displayed on the display device 105 in this embodiment. The items of information to be selectively displayed on the display device 105 in this embodiment are stored in advance in the HDD 103 of the information processing apparatus in FIG. 1. Each item of information has, for example, three parameters and, in the event that one or more of the parameters differ in value, it is considered a different item of information. A non-limiting example of information having such a configuration is RGB data.

Figure 2:
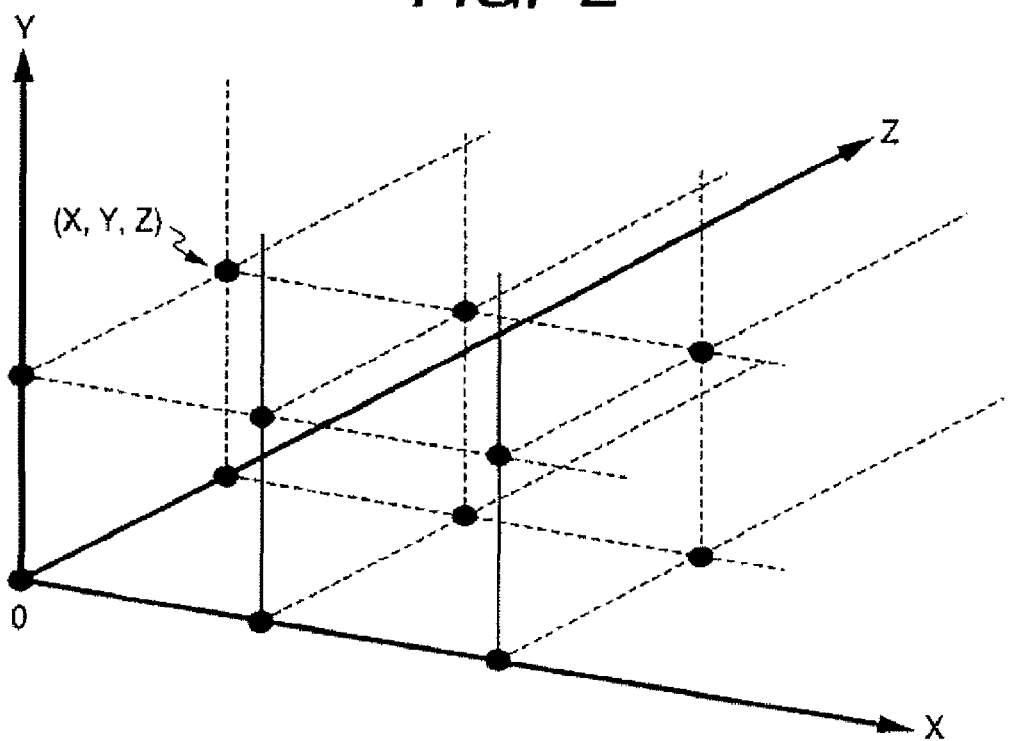
FIG. 2 is a diagram schematically showing a configuration of information selectively displayed on a display device according to the first embodiment of the invention.

FIG. 2 is a view schematically showing a configuration of the items of information to be selectively displayed on the display device 105 in this embodiment. In FIG. 2, small black circles indicate individual items of information. X, Y and Z spatial coordinates are allocated to corresponding parameters configuring each of the items of information, and thereby each of the items of information can be perceived as a point in a three-dimensional space, and has a mutual three-dimensional relationship.

Each of dimensions is defined as a relation criterion that relates one of the items of information to another, and therefore, in an x-dimensional relation criterion, the values of parameters corresponding to X differ while the values of parameters corresponding to Y and Z are the same. In a y-dimensional relation criterion, the values of parameters corresponding to Y differ while the values of parameters corresponding to Z and X are the same. In a z-dimensional relation criterion, the values of parameters corresponding to Z differ while the values of parameters corresponding to X are the same in value.

Also, the closer the values of the parameters corresponding to X, Y and Z are, the more similar in contents the individual items of information are. That is, when items of information having the same x-dimensional relation criterion are compared, the smaller a difference in value between the parameters corresponding to X, the closer in contents the items of information are. Items of information adjacent to each other in FIG. 2 have a slight difference between their contents, while items of information located in distant positions from each other in FIG. 2 have a great difference between their contents.

Figure 3:
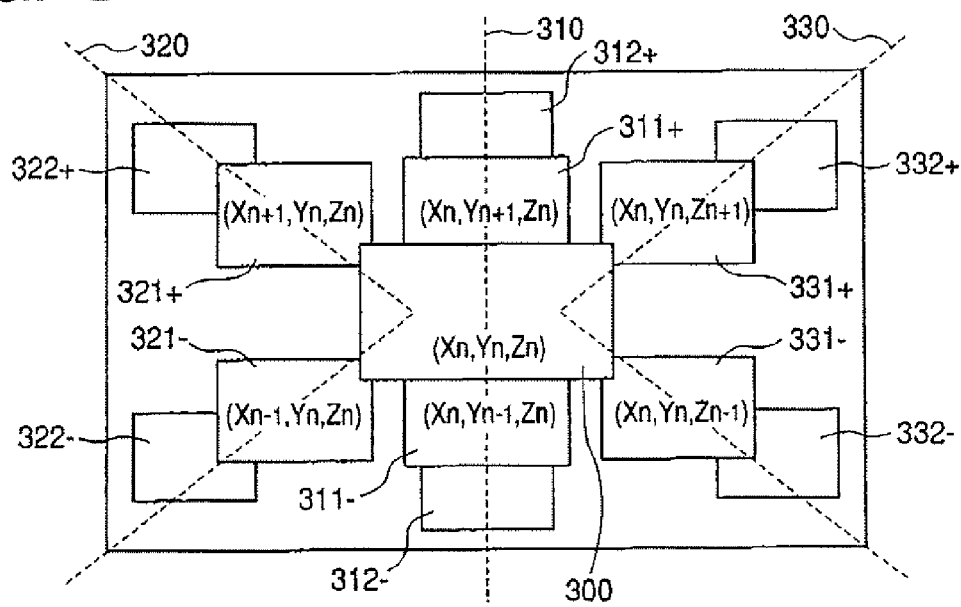
FIG. 3 is a diagram showing an example of a display mode of the information selectively displayed on the display device according to the first embodiment of the invention.

Next, a description will be given of a display mode of items of information on the display device 105 in this embodiment. FIG. 3 is a diagram showing an example of a display mode of the items of information to be selectively displayed on the display device 105 in this embodiment. In FIG. 3, the large item of information displayed in the center is specified as information 300. As described heretofore, the x, y or z-dimensional relation criterion is determined by which of the parameters corresponding to X, Y or Z included in the item of information selected as the specified information 300 differs in value, and thus one of the dimensional relation criteria is selected as a selected relation criterion.

The other items of information, other than the specified information, relating to the specified information 300 via the selected relation criterion are displayed aligned on a selection axis 310. Items of information 311+ and 311−, which are aligned on the selection axis 310, are respectively larger and smaller than the specified information 300 by one in a value of a parameter corresponding to the selected relation criterion, and items of information 312+ and 312− are respectively larger and smaller than the specified information 300 by two in a value of a parameter corresponding to the selected relation criterion. The items of information 311+ and 311−, which are closer in parameter value to the specified information 300, are displayed larger than the items of information 312+ and 312−. Also, of items of information aligned on the selection axis 310, items of information differing from the specified information 300 by three or more in a value of a parameter corresponding to the selected relation criterion are not displayed on the display device 105.

Other items of information relating to the specified information 300 by the other relation criteria, other than the selected relation criterion, are displayed aligned on a non-selection axis for each of the relation criteria. Items of information 321+ and 321−, which are aligned on a non-selection axis 320, are respectively larger and smaller than the specified information 300 by one in a value of a parameter corresponding to a relation criterion other than the selected relation criterion. Items of information 322+ and 322− are respectively larger and smaller than the specified information 300 by two in a value of a relation criterion corresponding to the selected relation criterion. The items of information 321+ and 321−, which are closer in parameter value to the specified information 300, are displayed larger than the items of information 322+ and 322−. Also, items of information aligned on the non-selection axis 320 differing from the specified information 300 by three or more in a value of a parameter, corresponding to a relation criterion other than the selected relation criterion, are not displayed on the display device 105. Items of information 331+, 331−, 332+ and 332−, which are aligned on a non-selection axis 330, are also similar in configuration to the items of information aligned on the non-selection axis 320.

The selection axis 310 and the non-selection axes 320 are not necessarily displayed on the display device 105, as long as they are recognized by the user. For processing purposes, it is not necessary that the selection axis 310 and the non-selection axes 320 and 330 are recognized by the CPU 101. That is, an axis on which items of information relating to the specified information 300, via the selected relation criterion, are apparently recognized to be aligned is the selection axis 310. Also, an axis on which items of information relating to the specified information 300, via each of the other relation criterion, other than the selected relation criterion, are apparently recognized to be aligned are the non-selection axes 320, 330.

In the event that the y-dimensional relation criterion becomes the selected relation criterion (in the case of, for example, FIG. 3), other items of information relating to the specified information 300, via the x-dimensional relation criterion, are displayed aligned on the non-selection axis 320. Also, other items of information relating to the specified information 300, via the z-dimensional relation criterion, are displayed as being aligned on the non-selection axis 330. In the event that the z-dimensional relation criterion becomes the selected relation criterion, other items of information related to the specified information 300, which are related by the y-dimensional relation criterion are displayed as being aligned on the non-selection axis 320. Also, in this case, other items of information relating to the specified information 300 via the x-dimensional relation criterion are displayed as being aligned on the non-selection axis 330. In the case where the x-dimensional relation criterion becomes the selected relation criterion, other items of information relating to the specified information 300 via the z-dimensional relation criterion are displayed as being aligned on the non-selection axis 320. Also, in this case, other items of information relating to the specified information 300 via the y-dimensional relation criterion are displayed as being aligned on the non-selection axis 330.

The user can, according to an up, down, left or right operation of the direction keys of the input device 104, change a selection of the selected relation criterion to another relation criterion relating to the specified information 300. For example, as shown in FIG. 3, in the event that values of parameters of the specified information 300 are (Xn, Yn, Zn) and the y-dimensional relation criterion is the selected relation criterion, besides the specified information 300, items of information (Xn, Yn+2, Zn), (Xn, Yn+1, Zn), (Xn, Yn−1, Zn) and (Xn, Yn−2, Zn) differing in values of parameters in the y-dimension are displayed aligned on the selection axis 310 as the items of information 312+, 311+, 311− and 312−. As shown in FIG. 3, items of information differing in parameter value in the x-dimension and the z-dimension, which are different relation criteria, are displayed aligned on the non-selection axes 320 and 330, respectively.

At this point, when the left direction key is operated, in accordance with the left direction, the selected relation criterion is changed from the y-dimensional relation criterion to the z-dimensional relation criterion, which is a relation criterion of the non-selection axis 330. Relation criteria of the non-selection axes 320 and 330 are also changed to the x-dimension and the y-dimension, respectively.

Furthermore, when an operation of the left direction key is carried out, the selected relation criterion is changed from the z-dimensional relation criterion to the x-dimensional relation criterion. Relation criteria of the non-selection axes 320 and 330 are also changed to the z-dimension and the y-dimension, respectively. Also in the event that the right direction key of the input device 104 is operated, relation criteria of the selection axis 310 and the non-selection axes 320 and 330 are changed in reverse order to that just described above with respect to the left direction key. By an input from the left and right direction keys, the selected relation criterion of the selection axis 310 and the relation criteria of the non-selection axes 320 and 330 are changed, but the specified information 300 is not changed.

Also, the user can, according to an operation of the up and down direction keys of the input device 104, change the specified information 300 to another item of information displayed in a position adjacent to the specified information 300 on the selection axis 310. For example, when an operation of the down direction key is carried out in FIG. 3, in accordance with the down direction, the specified information 300 is changed from an item of information having (Xn, Yn, Zn) as its parameter values to an item of information which, being located in an upper position on the selection axis 310, has (Xn, Yn+1, Zn) as its parameter values. According to the change of the specified information 300, each of the other items of information displayed on the selection axis 310 is displayed as being shifted upward or downward by one according to the relevant input direction.

Also, according to the change of the specified information 300, the items of information displayed aligned on the non-selection axes 320 and 330 are changed to items of information corresponding to parameter values of the new specified information 300. For example, in the event that the specified information 300 is changed to (Xn, Yn+1, Zn) from the condition shown in exemplary FIG. 3, besides the specified information 300, items of information (Xn+2, Yn+1, Zn), (Xn+1, Yn+1, Zn), (Xn−1, Yn+1, Zn) and (Xn−2, Yn+1, Zn) differing in x-dimensional parameter value are displayed aligned on the non-selection axis 320 as items of information 322+, 321+, 321− and 322−, respectively. The same also applies to items of information 332+, 331+, 331− and 332− on the non-selection axis 330.

As described heretofore, an item of information selected as the specified information 300 is sequentially changed by operating the up and down direction keys of the input device 104, while the relation criteria of the items of information displayed on the selection axis 310 and the non-selection axes 320 and 330 is sequentially changed by an operation of the left and right direction keys of the input device 104. Each time the selection of the specified information 300 or selected relation criterion is changed, a history of the changes is recorded in the main memory 102. Also, a selection condition of the specified information 300 and selected relation criterion at any time is bookmarked, thereby enabling a restoration at any time of the selection condition and the selected relation criterion.

Figure 4A:
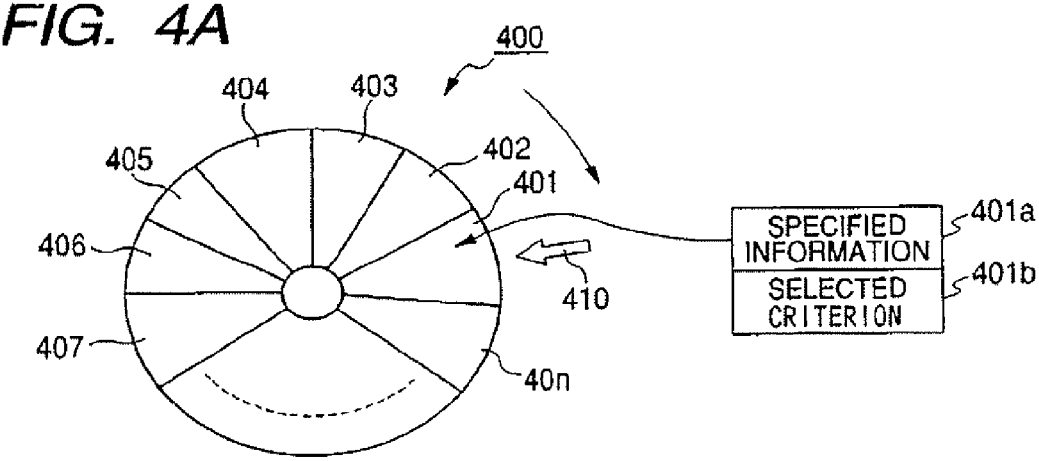
FIGS. 4A and 4B are diagrams showing a configuration of a history buffer provided in a main memory and a configuration of a bookmark buffer.

FIG. 4A is a diagram showing a configuration of a history buffer provided in the main memory 102. The history buffer 400 is configured of a ring buffer formed of a plurality of history storage areas 401 to 40n. The history storage area 401 includes a specified information area 401a and a selected criterion area 401b. The history storage areas 402 to 40n also have the same configuration as the history storage area 401.

Also, a pointer 410 indicates a history storage area (such as, for example, the history storage area 401 in FIG. 4A) which records a selection condition of the specified information 300 and the selected relation criterion at the present time.

When the user actuates an up, down, left or right direction key, thereby inputting a corresponding up, down, left or right direction instruction, of the input device 104, the display mode of the display device 105 is changed according to the input direction instruction. Specifically, in the event of an input from the up and down direction keys, the specified information 300 is changed while, in the event of an input from the left and right direction keys, the selected relation criterion is changed. Each time the display mode is changed, an item of information indicating the specified information 300 and the selected relation criterion in the new display mode is stored in a history storage area subsequent to the history storage area indicated by the pointer at the present time, and the pointer 410 is moved to the subsequent storage area.

When the user actuates an X-button of the input device 104, the pointer 410 returns to a history storage area immediately before the history storage area indicated by the pointer 410 in the history buffer 400, and the previous input instruction from a direction key is cancelled. In this way, the specified information and the selected relation criterion stored in the history storage area to which the pointer 410 has returned are read, and a display mode, for which history is restored, is displayed on the display device 105. The user, by repeating an actuation of the X-button, can trace input histories of the up and down direction keys of the input device 104, one by one.

Figure 4B:
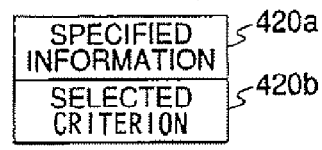

FIG. 4B is a diagram showing a configuration of a bookmark buffer provided in the main memory 102. The bookmark buffer 420 includes a specified information area 420a and a selected criterion area 420b. When the user actuates the square button of the input device 104, an item of information selected as the specified information 300 at that time is recorded in the specified information area 420a, and a relation criterion selected as the selected relation criterion is recorded in the selected criterion area 420b. In the event that, prior to an operation of the square button, there is data is registered in the bookmark buffer 420 in response to a prior operation of the square button, the registered data is caused to be overwritten by the subsequent actuation of the square button.

When the user actuates the triangle button of the input device 104, in accordance with the specified information stored in the specified information area 420a and the selection condition of the selected relation criterion stored in the selected criterion area 420b, the display mode, when the user actuates the square button of the input device 104, is restored and displayed on the display device 105. The specified information 300 and selected relation criterion restored at this point are also recorded in the subsequent history storage area of the history buffer 400 as new history data.

In the event that no data are registered in the specified information area 420a or selected criterion area 420b of the bookmark buffer 420 prior to the actuation of the triangle button (for example, no bookmarking has been carried out by an instruction from the square button), the display mode of the display device 105 is not changed by an actuation of the triangle button.

Figure 5:
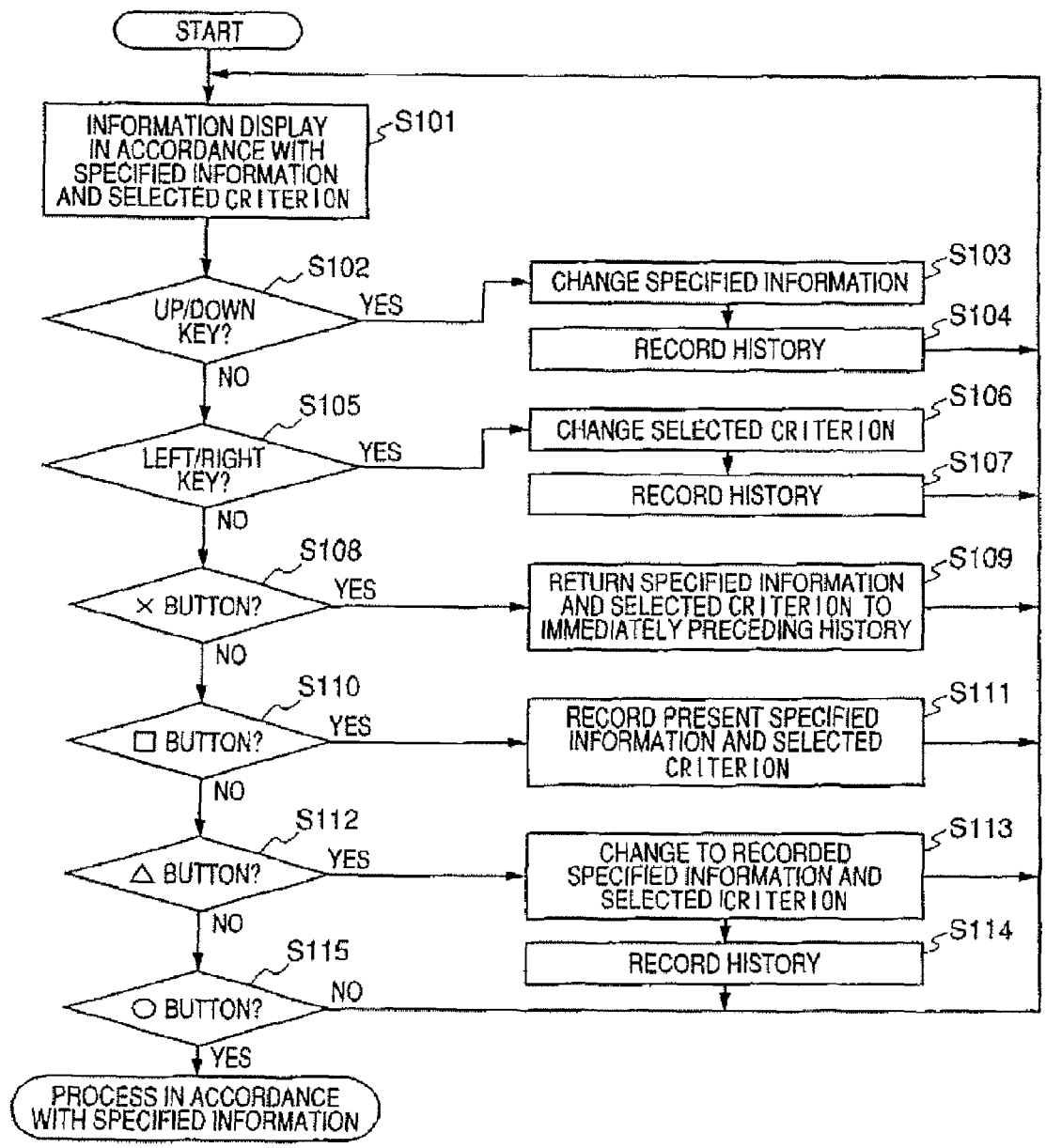
FIG. 5 is a flowchart showing a process according to the first embodiment of the invention.

Hereafter, a description will be given of a process executed in the information processing apparatus according to this embodiment. FIG. 5 is a flowchart showing an exemplary, non-limiting process in this embodiment. Although other processing steps, other than those shown here, are carried out in the information processing apparatus, the processing steps minimally necessary for describing the invention are shown here.

First, in the information processing apparatus, the CPU 101 reads the specified information stored in the specified information area 401a and the selected relation criterion stored in the selected criterion area 401b, from the history storage area indicated by the pointer 410 among the plurality of history storage areas 401 to 40n of the history buffer 400 (FIG. 4A) provided in the main memory 102. Then, the CPU 101 displays items of information on the display device 105 in accordance with the specified information and selected relation criterion (step S101) that was read.

Next, the CPU 101 determines whether or not the up or down direction keys of the input device 104 are actuated (step S102). If there is an actuation of the up or down direction keys ("Yes" at step S102), the CPU 101, in accordance with the direction input from the direction keys, changes another item of information related to the specified information 300 by the selected relation criterion at the present time to new specified information 300 (step S103). Next, the CPU 101 stores the changed selection condition of the specified information 300 and selected relation criterion in a history storage area subsequent to the history storage area indicated by the pointer 410 in the history buffer 400, and moves the pointer 410 to the subsequent history storage area (step S104). Then, the CPU 101 returns to the process in step S101.

If there is no actuation of the up or down direction keys ("No" at step S102), the CPU 101 determines whether there is an actuation of the left or right direction keys of the input device 104 (step S105). If there is an actuation of the left or right direction keys ("Yes" at step S105), the CPU 101, in accordance with the direction input from the direction keys, changes the selected relation criterion to another relation criterion with respect to the specified information 300 at the present time (step S106). Next, the CPU 101 stores the changed selection condition of the specified information 300 and selected relation criterion in a history storage area subsequent to the history storage area indicated by the pointer 410 in the history buffer 400, and moves the pointer 410 to the subsequent history storage area (step S107). Then, the CPU 101 returns to the process in step S101.

If there is no actuation of the left or right direction keys ("No" at step S105), the CPU 101 determines whether there is an actuation of the X-button of the input device 104 (step S108). If there is an actuation of the X-button, the CPU 101 returns the pointer 410 to a history storage area immediately before the history storage area indicated by the pointer 410 in the history buffer 400 provided in the main memory 102, thereby returning the display mode of the display device 105 to the previous condition in history (step S109). Then, the CPU 101 returns to the process in step S101.

If there is no actuation of the X-button ("No" at step S108), the CPU 101 determines whether there is an actuation of the square button of the input device 104 (step S110). If there is an actuation of the square button ("Yes" at step S110) the CPU 101 stores an item of information selected as the specified information 300 at that instant in time in the specified information area 420a of the bookmark buffer 420 provided in the main memory 102. At the same time, the CPU 101 stores a relation criterion selected as the selected relation criterion at that instant in time in the selected criterion area 420b (step S111). Then, the CPU 101 returns to the process in step S101.

If there is no actuation of the square button ("No" at step S10), the CPU 101 determines whether there is an actuation of the triangle button of the input device 104 (step S112). If there is an actuation of the triangle button ("Yes" at step S112), the CPU 101 reads specified information stored in the specified information area 420a of the bookmark buffer 420 and a selected relation criterion stored in the selected criterion area 420b, and carries out a change to display information corresponding to the read specified information and selected relation criterion (step S113). Next, the CPU 101 stores the changed selection condition of the specified information 300 and selected relation criterion in a history storage area subsequent to the history storage area indicated by the pointer 410 in the history buffer 400, and moves the pointer 410 to the subsequent history storage area (step S114). Then, the CPU 101 returns to the process in step S101.

If there is no actuation of the triangle button ("No" at step S112), the CPU 101 determines whether there is an actuation of the circle button of the input device 104 (step S115). If there is an actuation of the circle button ("Yes" at step S115), the CPU 101 carries out a process according to the specified information 300 at that instant in time. As this process has no direct relationship to the invention, a detailed description will be omitted. If there is no actuation of the circle button ("No" at step S115), the CPU 101 returns to the process in step S101.

Hereafter, a description will be given, based on a specific example, of a change in a display mode of the information displayed on the display device 105 in this embodiment. FIGS. 6A to 6H are diagrams specifically showing a change in a display mode of the information displayed on the display device 105 in this embodiment.

As shown in FIG. 6A, the display device 105 displays 13 items of information each having values of three parameters (X, Y, Z). In FIG. 6A, the values of the parameters (X, Y, Z) of the specified information 300 displayed in the center of the display device 105 are (10, 10, 10), and the selected relation criterion is the y-dimensional relation criterion.

At this point, the items of information aligned on the selection axis 310, including the specified information 300, are, in order from the top, (10, 12, 10), (10, 11, 10), (10, 10, 10), (10, 9, 10) and (10, 8, 10). The items of information aligned on the non-selection axis 320 are, in order from the top, (12, 10, 10), (11, 10, 10), (10, 10, 10), (9, 10, 10) and (8, 10, 10). Items of information aligned on the non-selection axis 330 are, in order from the top, (10, 10, 12), (10, 10, 11), (10, 10, 10), (10, 10, 9) and (10, 10, 8).

When the down direction key is actuated on the input device 104 in a condition in which FIG. 6A is displayed on the display device 105, the display mode changes to that as shown in FIG. 6B. In FIG. 6B, the items of information aligned on the selection axis 310 are moved down by one, and the specified information 300 becomes (10, 11, 10), along with which the items of information on the non-selection axes 320 and 330 also change.

At this point, the items of information aligned on the selection axis 310, including the specified information 300, are, in order from the top, (10, 13, 10), (10, 12, 10), (10, 11, 10), (10, 10, 10) and (10, 9, 10). The items of information aligned on the non-selection axis 320 are, in order from the top, (12, 11, 10), (11, 11, 10), (10, 11, 10), (9, 11, 10) and (8, 11, 10). The items of information aligned on the non-selection axis 330 are, in order from the top, (10, 11, 12), (10, 11, 11), (10, 11, 10), (10, 11, 9) and (10, 11, 8).

Next, when the right direction key is actuated on the input device 104 in a condition in which FIG. 6B is displayed on the display device 105, the display mode changes to that as shown in FIG. 6C. In FIG. 6C, although the specified information 300 remains (10, 11, 10), the selected relation criterion of the selection axis 310 becomes the x-dimensional relation criterion, and the relation criteria of the non-selection axes 320 and 330 become the z-dimensional and y-dimensional relation criteria, respectively.

At this point, items of information aligned on the selection axis 310, including the specified information 300, are, in order from the top, (12, 11, 10), (11, 11, 10), (10, 11, 10), (9, 11, 10) and (8, 11, 10). The items of information aligned on the non-selection axis 320 are, in order from the top, (10, 11, 12), (10, 11, 11), (10, 11, 10), (10, 11, 9) and (10, 11, 8). The items of information aligned on the non-selection axis 330 are, in order from the top, (10, 13, 10), (10, 12, 10), (10, 11, 10), (10, 10, 10) and (10, 9, 10).

Next, when the up direction key is actuated on the input device 104 in a condition in which FIG. 6C is displayed on the display device 105, the display mode changes to that as shown in FIG. 6D. In FIG. 6D, the items of information aligned on the selection axis 310 are moved up by one, and the specified information 300 becomes (9, 11, 10), along with which the items of information on the selection axes 320 and 330 also change.

At this point, items of information aligned on the selection axis 310, including the specified information 300, are, in order from the top, (11, 11, 10), (10, 11, 10), (9, 11, 10), (8, 11, 10) and (7, 11, 10). The items of information aligned on the non-selection axis 320 are, in order from the top, (9, 11, 12), (9, 11, 11), (9, 11, 10), (9, 11, 9) and (9, 11, 8). The items of information aligned on the non-selection axis 330 are, in order from the top, (9, 13, 10), (9, 12, 10), (9, 11, 10), (9, 10, 10) and (9, 9, 10).

Next, when the X-button is actuated on the input device 104 in a condition in which FIG. 6D is displayed on the display device 105, the previous history is retrieved and the same display mode as that in FIG. 6C is displayed on the display device 105, as shown in FIG. 6E.

Next, when the square button is actuated on the input device 104 when FIG. 6E is displayed on the display device 105, as shown in FIG. 6F, the display mode does not change from the condition shown in FIG. 6E, but the information (10, 11, 10) selected as the specified information 300 at the time the square button is actuated and the x-dimensional relation criterion selected as the selected relation criterion are recorded in the bookmark buffer 420.

After that, a display mode as that shown in FIG. 6G may be displayed in response to an actuation of the other buttons, other than the square button of the input device 104. When the triangle button is actuated on the input device 104 when FIG. 6G is displayed on the display device 105, the information (10, 11, 10) and x-dimensional relation criterion stored in the bookmark buffer 420 becomes the new specified information 300 and selected relation criterion. Accordingly, as shown in FIG. 6H, the display mode when the user actuated the square button of the input device 104, that is, the display mode shown in FIG. 6F, is restored on the display device 105.

As described heretofore, in the first embodiment, the specified information 300 is displayed in the center of the display device 105. Other items of information relating to this specified information 300 in accordance with the values of three parameters X, Y and Z are displayed in other positions, other than the center, on the display device 105. At this point, the specified information 300 is related to other items of information by three relation criteria X, Y and Z, and one relation criterion is selected as the selected relation criterion. Other items of information relating to the specified information 300 via the selected relation criterion are displayed aligned on the selection axis 310. In this way, the user can visually perceive other items of information relating to the specified information 300 via the selected relation criterion with the focus on the specified information 300 displayed on the display device 105.

Also, not only are other items of information relating to the specified information 300 by way of selected relation criterion displayed, but also other items of information related to the specified information 300 by other relation criteria, other than the selected relation criterion, are displayed on the display device 105 as being aligned on the non-selection axes 320 and 330 for each relation criterion. Thus, the other items of information relating to the specified information 300 via other relation criteria, other than the selected relation criterion, can also be visually perceived simultaneously with the items of information relating to the specified information 300 via the selected relation criterion.

At this point, if an actuation of the up or down keys of the input device 104 is carried out, the specified information 300 can be changed to another item of information which is displayed in a position adjacent to the specified information 300 on the selection axis 310 according to the input direction. For example, on the selection axis 310 displayed on the display device 105, in order to change the specified information 300 to the information 311+ displayed in an upper position (as shown in FIG. 3), the down direction key of the input device 104 may be operated. Also, in order to change the specified information 300 to the information 311− displayed in a lower position, the up direction key of the input device 104 may be operated. By repeatedly carrying out this kind of input from the up and down direction keys, items of information related by the same relation criterion can be sequentially displayed in the center of the display device 105 as the specified information 300.

When the specified information 300 is changed by an input from the up and down direction keys, items of information displayed aligned on the selection axes 320 and 330 also change in accordance with the new specified information 300. That is, when the up or down direction keys of the input device 104 are actuated, it becomes possible to change the specified information 300 and to change other items of information aligned on the non-selection axes 320 and 330 by relation criteria according to the changed specified information 300. For at least this reason, when the specified information 300 is changed, the user can easily visually perceive items of information related to the new specified information 300.

Also, should the user become interested in other items of information displayed on the non-selection axes 320 and 330, or the like, by actuating the left or right direction keys of the input device 104, it becomes possible to change a relation criterion, which has not been selected as the selected relation criterion, to the selected relation criterion. For example, in order to change the selected relation criterion to a relation criterion of the non-selection axis 330 displayed in a right position relative to the selection axis 310 on the display device 105 (as shown, for example, in FIG. 3), the left direction key of the input device 104 may be operated. Also, in order to change the selected relation criterion to a relation criterion of the non-selection axis 320 displayed in a left position relative to the selection axis 310, the right direction key of the input device 104 may be operated. An item of information that may next be specified as the information 300 is limited to items of information relating to the specified information 300 via the selected relation criterion. However, the user can select an item of information relating to the present specified information 300 via any relation criterion as the next specified information 300 by making the selected relation criterion changeable as described above.

Then, by combining an actuation of the up or down direction keys of the input device 104 with an actuation of the left or right direction keys of the input device 104, the user can reach a desired item of information by a visual comparison from an item of information which has been made the specified information 300 at a certain time. By sequentially changing the specified information 300 and the selected relation criterion by an input from the input device 104 in this way, it becomes possible to easily reach a desired item of information from among a plurality of items of information intricately related to each other, by visual perception. In this way, even from among the plurality of items of information intricately related to each other, as the specified information 300 is temporarily changed between comparatively closely related items of information, even though the user has not previously decided a target item of information, it is possible to locate an item of information in accordance with a user's taste.

Also, on the display device 105, as the specified information 300 is displayed in the center as being larger than the other items of information, an item of information selected as the specified information 300 at the present time becomes easier for the user to visually comprehend than the other items of information.

Meanwhile, of the items of information 312+, 311+, 311− and 312− displayed on the selection axis 310 besides the specified information 300 (as shown, for example, in FIG. 3), the closer to the specified information 300 in values of parameters corresponding to the selected relation criterion, (the more similar in contents to the specified information 300), the closer an item of information is displayed to the specified information 300. Also, the items of information 311+ and 311−, which are adjacent to the specified information 300, are displayed larger than the items of information 312+ and 312− not adjoining the specified information 300. Also, the same applies to items of information displayed on the non-selection axes 320 and 330.

In this way, by displaying an item of information, which is more similar in contents to the specified information 300, closer to the specified information 300, it becomes easier for the user to comprehend how to select a next specified information 300 to reach a desired item of information. Also, by displaying an item of information that is adjacent to the specified information 300 larger than an item of information that is not adjacent, another item of information, which can be selected as specified information 300 subsequently to the present specified information 300 by an input from the input device 104, becomes easier for the user to visually perceive, and it becomes possible to more easily carry out an information selection.

Also, the number of items of information displayed on any of the selection axis 310 and the non-selection axes 320 and 330 is limited, apart from the specified information 300. For at least this reason, even though there are a large number of items of information relating to the specified information 300 via each of the relation criteria, a display size of other items of information, other than the specified information 300 on the display device 105, is prevented from being too small. Also, even though the number of items of information that are displayed aligned on the selection axis 310 and the non-selection axes 320 and 330 is limited, as long as a fixed number of items of information are displayed, the user is not hindered from visually perceiving a relationship between the other items of information and the specified information 300.

Meanwhile, each time the specified information 300 and/or the selected relation criterion is changed, its selection condition history is recorded in the history storage areas 401 to 40$n$ (shown, for example, in FIG. 4A). When the user actuates the X-button of the input device 104, the selection condition of the specified information and the selected relation criterion stored in a history storage area as a history immediately previous to the present display mode is read. A display mode, in which the previous history has been restored, is displayed on the display device 105. With such a configuration, even when the present specified information 300 is thought to be farther away from a user's desired item of information, after a previous display mode is reproduced, the specified information 300 and the selected relation criterion can be selected over again. Thus, a selection of a user's desired item of information may be facilitated.

Also, when the user actuates the square button of the input device 104, the selection condition of the specified information 300 and selected relation criterion at the time of actuation is recorded. When the user later actuates the triangle button, the selection condition, of the specified information and the selected relation criterion, stored in the bookmark buffer 420 is read, and the display mode when the user actuated the square button is restored on the display device 105. When the user becomes curious about a selection condition of the specified information 300 and selected relation criterion at a certain point, it is possible to bookmark the point and restore the bookmarked display mode at any later time. With such a configuration, even when the present specified information 300 is thought to be farther away from a user's desired item of information, after the bookmarked display mode is reproduced, the specified information 300 and the selected relation criterion can be selected over again. Thus, a selection of a user's desired item of information may be facilitated.

Meanwhile, as the display device 105 generally displays an image in a planar configuration, a plurality of items of information can be only two-dimensionally arranged on the display device 105. With a three-dimensional arrangement of items of information, it is possible to project an information relationship onto a two-dimensional plane by means of a perspective transformation or the like, but a tridirectional input is required. In contrast, in this embodiment, although the input device 104 includes only up, down, left and right two-dimensional direction keys, by selecting the selected relation criterion by an input from the left and right direction keys and selecting the specified information 300 by an input from the up and down direction keys, the user can use three-dimensional relation criteria to visually perceive a relationship of each item of information and easily select a desired item of information from among a plurality of items of information.

Furthermore, when the user actuates the circle button of the input device 104, a process according to an item of information which is made the specified information 300 is carried out. In this way, a process set according to the specified information 300 is carried out by an actuation of the circle button, the user can visually perceive and select a process which he or she wants to carry out.

Second Embodiment

A configuration of an information processing apparatus applied to this embodiment is the same as that of the information processing apparatus shown in the first embodiment. In this embodiment, a configuration of the information selectively displayed on the display device 105 in response to an input from the input device differs from that of the first embodiment. Also, because of this difference in the information configuration, a number of axes on which the information is displayed, which is based on specified information displayed in the center of the display device 105, varies according to the specified information.

Figure 7:
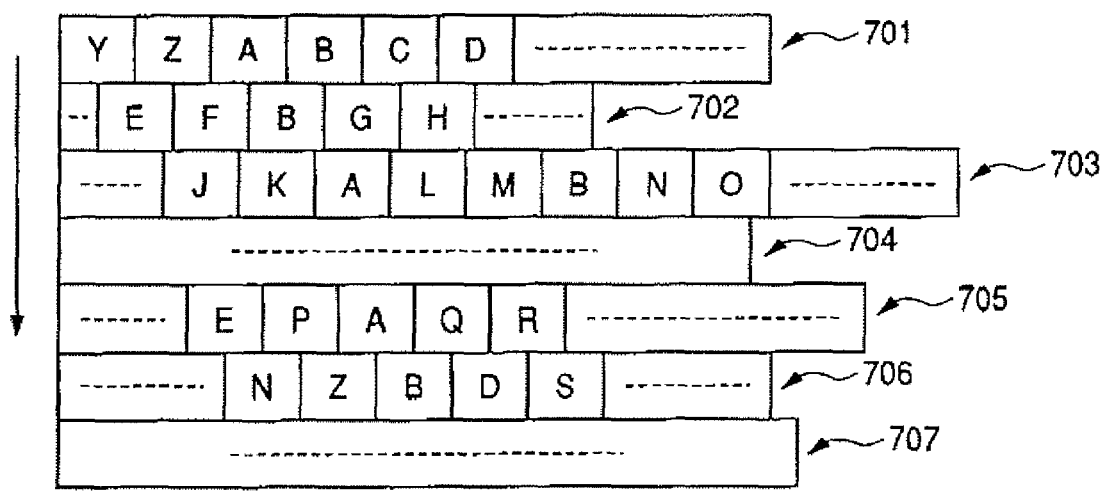
FIG. 7 is a diagram schematically showing a configuration of information selectively displayed on a display device according to a second embodiment of the invention.

FIG. 7 is a diagram schematically showing a configuration of information selectively displayed on the display device 105 in this embodiment. At this point, items of information relating to each other via identical relation criteria are grouped together, forming information packages 701 to 707 for each relation criterion. The information packages 701 to 707 are stored in advance in the HDD 103 of the non-limiting exemplary information processing apparatus shown in FIG. 1. In one information package, items of information having close similarity in their contents when considered with regard to the relevant relation criterion are recorded adjacent to each other. Each of the items of information in the information packages 701 to 707 is not necessarily an information content, but may instead be a pointer to an item of information having content.

Figure 8A:
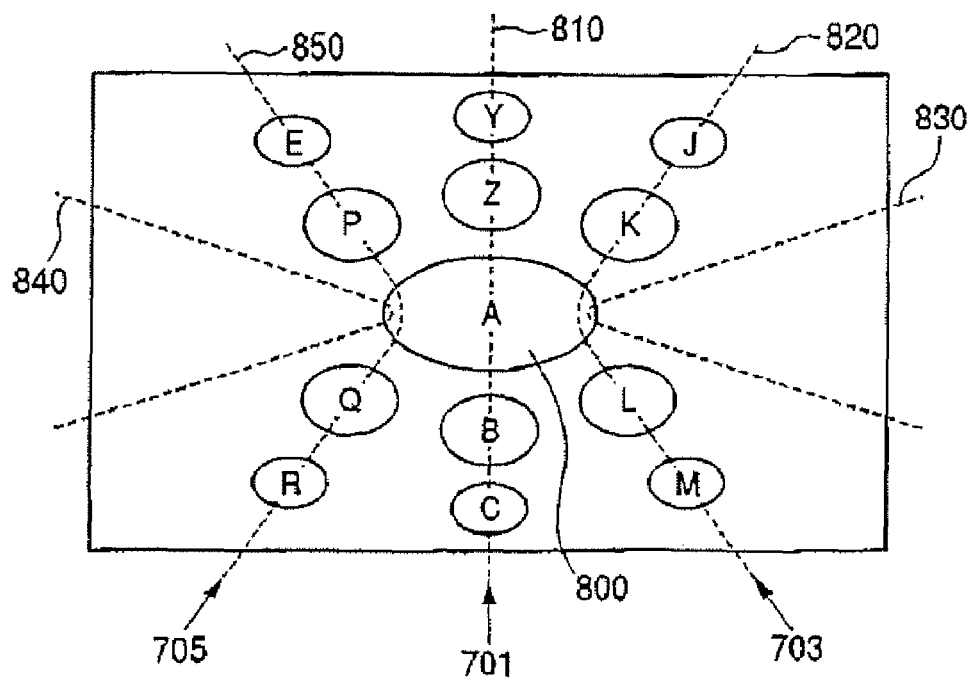
FIGS. 8A and 8B are diagrams showing an example of a display mode of the information selectively displayed on the display device according to the second embodiment of the invention.
Figure 8B:
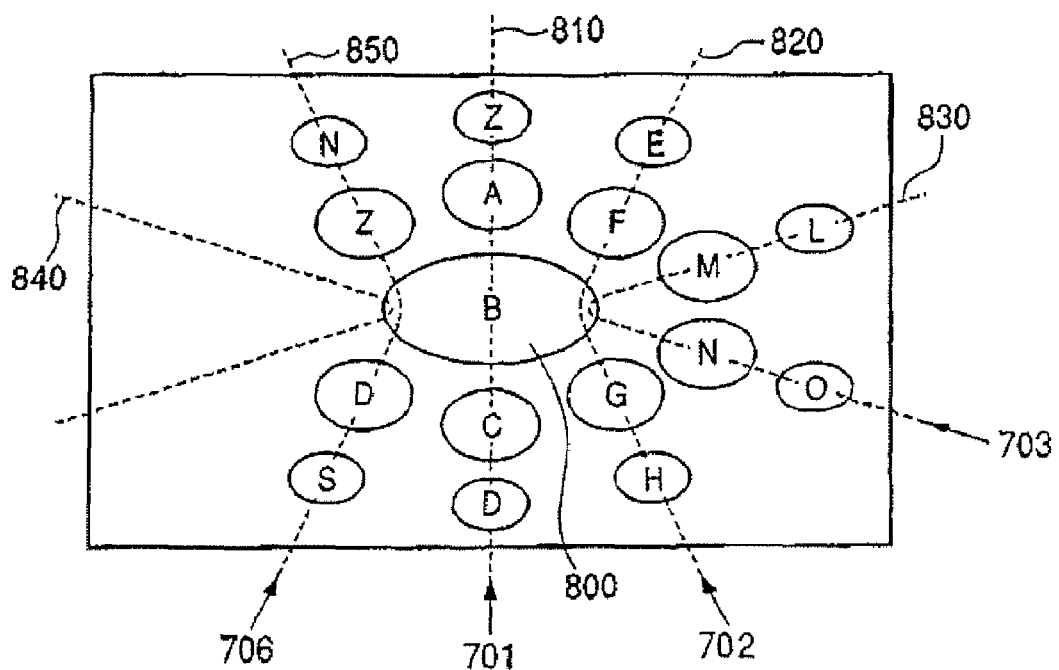

Next, a description will be given for a display mode of items of information on the display device 105 in accordance with this embodiment. FIGS. 8A and 8B are diagrams showing examples of display modes for items of information selectively displayed on the display device 105 in this embodiment. In FIGS. 8A and 8B, an item of information that is displayed larger than the other surrounding items and is also displayed in the center is specified information 800. A relation criterion corresponding to any one of the information packages, including an item of information selected as the specified information 800, is selected as a selected relation criterion.

Other items of information related to the specified information 800 by the selected relation criterion are displayed as being aligned on a selection axis 810. For example, items of information Y, Z, B and C, which are aligned on the selection axis 810 in FIG. 8A, are two previous and two subsequent items of information centered around information A, which is the specified information 800. The items Y, Z, B and C are stored in an order in the information package 701 (FIG. 7) corresponding to the selected relation criterion with respect to the specified information 800 (for example, an order in which items of information having close similarity in contents with regard to the relevant relation criterion). The items of information Z and B adjacent to the information A are displayed larger than the items of information Y and C. Also, in the disclosed embodiment, of the items of information aligned on the selection axis 810, the items of information located three or more elements away from the specified information 800 in their storage positions in an information package corresponding to the selected relation criterion are not displayed on the display device 105. However, these items of information may be displayed without departing from the scope and/or spirit of the invention.

Other items of information relating to the specified information 800 by way of other relation criteria, other than the selected relation criterion, are displayed on non-selection axes 820 to 850 for respective relation criteria, that is, for respective information packages. For example, in FIG. 8A, items of information J, K, L and M aligned on the non-selection axis 820 are two previous and two subsequent items of information centered around the information A, which are displayed in an order in which they are stored in the information package 703 with respect to the information A, which is the specified information 800. The items of information K and L adjacent to the information A are displayed larger than the items of information J and M.

Also, where there are a plurality of information packages including an item of information selected as the specified information 800, up to four information packages may be selected according to storage positions in an order based on an information package which is made as the selected relation criterion. The other items of information relating to the specified information 800 via the relation criteria, corresponding to the selected information packages, are displayed on the display device 105 as being aligned on the non-selection axes 820 to 850 for each relation criterion.

The number of non-selection axes 820 to 850 varies according to the number of information packages that include an item of information selected as the specified information 800. That is, information packages that include an item of information selected as the specified information 800 are searched for, and the non-selection axes 820 to 850 is set according to the number of information packages found. For example, if information A is included in three information packages 701, 703 and 705, in the event that the information A is set as the specified information 800, and a relation criterion corresponding to the information package 701 is set as the selected relation criterion, the items of information are displayed as being aligned on only two non-selection axes 820 and 850. In case that there is only one information package including an item of information selected as the specified information 800, the other items of information are displayed as being aligned on the selection axis 810 with the one information package being the selected relation criterion. No other items of information are displayed on the non-selection axes 820 to 850.

When the up direction key is actuated on the input device 104 in a condition in which FIG. 8A is displayed on the display device 105, as shown in FIG. 8B, items of information aligned on the selection axis 810 move up by one, and information B becomes the new specified information 800. Also, when the down direction key is actuated on the input device 104 in a condition in which FIG. 8A is displayed on the display device, items of information aligned on the selection axis 810 move down by one, and information Z becomes the new specified information 800.

When the information B is set as the specified information 800 by an actuation of the up direction key, a search is made to find information packages that include the information B. For example, the information B may be included in the information packages 701, 702, 703 and 706 shown in FIG. 7. At this point, as shown in FIG. 8B, the other items of information E, F, G and H, other than the information B included in the information package 702, are displayed as being aligned on the non-selection axis 820. The other items of information L, X, N and O, other than the information B included in the information package 703, are displayed as being aligned on the non-selection axis 830. Furthermore, the other items of information N, Z, D and S, other than the information B included in the information package 706, are displayed as being aligned on the non-selection axis 850.

In the event that the left or right direction keys are actuated on the input device 104, in the same way as in the first embodiment, an information package to be selected as the selected relation criterion changes according to the input. Information packages that are to become the relation criteria of the non-selection axes 820 to 850 also change with a change of the selected relation criterion. In this aspect, this embodiment is the same as the first embodiment in that the selection axis 810 and the non-selection axes 820 to 850 need only be recognized by the user, and need not be recognized by the CPU 101.

Furthermore, this embodiment is the same as the first embodiment in the aspect that, each time the specified information 800 or the selected relation criterion changes, its history is stored, and the previous display mode may be returned by an actuation of the X-button on the input device 104. This embodiment is also the same as the first embodiment in the aspect that the specified information 800 and the selected relation criterion are bookmarked in response to an actuation of the square button, and the bookmarked display mode may be restored by actuation of the triangle button. This embodiment is also the same as the first embodiment in the aspect that a process corresponding to the specified information 800 may be executed in response to an actuation of the circle button. Also, in case the specified information 800 is changed by an actuation of the X-button or the triangle button, an information package, including the same item of information as the new specified information 800, is retrieved in the same way as in the case in which the specified information 800 is changed in response to an actuation of the up or down direction keys.

Figure 9:
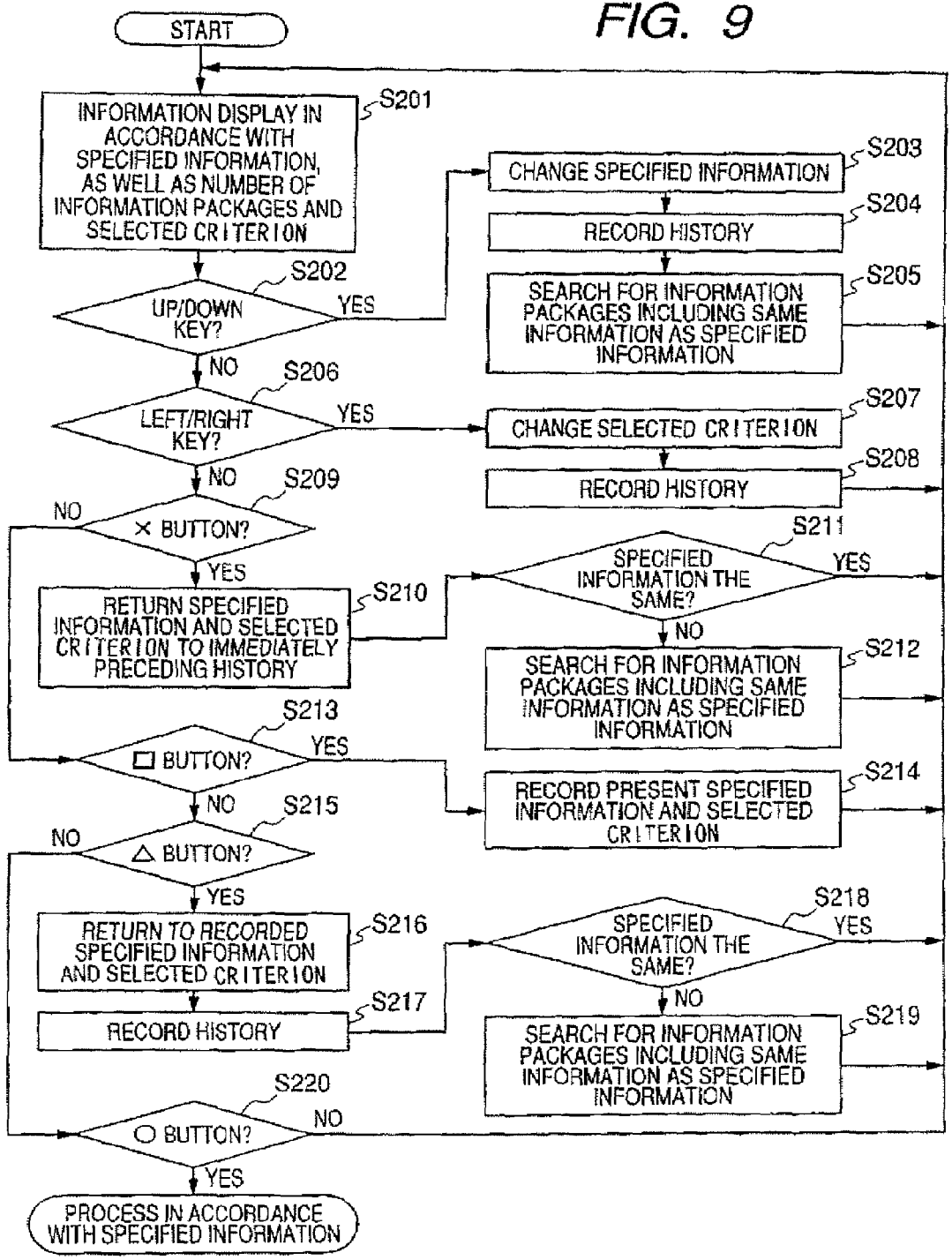
FIG. 9 is a flowchart showing a process according to the second embodiment of the invention.

Hereafter, a description will be given of an exemplary, non-limiting process executed in the information processing apparatus according to this embodiment. FIG. 9 is a flowchart showing an exemplary process in this embodiment. Although other processes, other than the process shown here, are carried out in the information processing apparatus as the skilled artisan will recognize, an exemplary, non-limiting process minimally necessary for describing the invention is shown here.

First, in the exemplary non-limiting information processing apparatus, the CPU 101 reads specified information, which is stored in the specified information area 401*a* in a history storage area indicated by the pointer 410 from the plurality of history storage areas 401 to 40*n* in the history buffer 400 provided in the main memory 102 (shown, for example, in FIG. 4A). The CPU 101 also reads a selected relation criterion (here, an information package type), which is stored in the selected criterion area 401*b*. Then, the CPU 101 displays information on the display device 105 in accordance with the read specified information, the information packages including this specified information, and the read selected relation criterion (step S201).

Next, the CPU 101 determines whether there is an input from the up or down direction keys of the input device 104 (step S202). If there is an input from the up or down direction keys ("Yes" at step S202), the CPU 101, in accordance with a direction input from the direction key, changes the specified information to another item of information, which is related to the present specified information 800 by the selected relation criterion, as the new specified information 800 (step S203). Next, the CPU 101 stores the changed selection condition of the specified information 800 and the selected relation criterion in a history storage area subsequent to the history storage area indicated by the pointer 410 in the history buffer 400, and moves the pointer 410 to the subsequent history storage area (step S204). The CPU 101 searches for an information package including the same information as the changed specified information 800 (step S205). Then, the CPU 101 returns to the process in step S201.

If there is no input from the up or down direction keys ("No" at step S202), the CPU 101 determines whether there is an input from the left or right direction keys of the input device 104 (step S206). If there is an input from the left or right direction keys, the CPU 101, in accordance with a direction input by the direction key, changes the selected relation criterion to another information package corresponding to the present specified information 800 (step S207). Next, the CPU 101 stores the changed selection condition of the specified information 800 and the selected relation criterion in a history storage area subsequent to the history storage area indicated by the pointer 410 in the history buffer 400, and moves the pointer 410 to the subsequent history storage area (step S208). Then, the CPU 101 returns to the process in step S201.

If there is no input from the left or right direction keys ("No" at step S206), the CPU 101 determines whether there is an input from the X-button of the input device 104 (step S209). If there is an input from the X-button ("Yes" at step S209), the CPU 101 returns the pointer 410 to a history storage area immediately previous to the history storage area indicated by the pointer 410 in the history buffer 400 provided in the main memory 102. By returning the pointer 410 to the previous history storage area, the display mode of the display device 105 is returned to the previous condition in history (step S210).

The CPU 101 determines whether the specified information to be changed is the same as the changed specified information (step S211). If they are the same ("Yes" at step S211), the CPU 101 returns to the process in step S201. On the other hand, if the items of specified information are not the same ("No" at step S211), the CPU 101 searches for an information package including the same information as the changed specified information 800 (step S212), and returns to the process in step S201.

If there is no input from the X-button ("No" at step S209), the CPU 101 determines whether there is an input from the square button of the input device 104 (step S213). If there is an input from the square button ("Yes" at step S213), the CPU 101 stores an item of information selected as the specified information 800 at the present time in the specified information area 420a of the bookmark buffer 420 provided in the main memory 102. At the same time, the CPU 101 stores a relation criterion selected as the selected relation criterion at the present time in the selected criterion area 420b (step S214). Then, the CPU 101 returns to the process in step S201.

If there is no input from the square button ("No" at step S213), the CPU 101 determines whether there is an input from the triangle button of the input device 104 (step S215). If there is an input from the triangle button ("Yes" at step S215) the CPU 101 reads specified information stored in the specified information area 420a of the bookmark buffer 420 and a selected relation criterion stored in the selected criterion area 420b. Then, the CPU 101 makes a change to the read specified information and selected relation criterion (step S216). Next, the CPU 101 stores the changed selection condition of the specified information 800 and selected relation criterion in a history storage area subsequent to the history storage area indicated by the pointer 410 in the history buffer 400, and moves the pointer 410 to the subsequent history storage area (step S217).

The CPU 101 determines whether the specified information to be changed is the same as the changed specified information (step S218). If they are the same ("Yes" at step S218), the CPU 101 returns to the process in step S201. On the other hand, if the items of specified information are not the same ("No" at step S218), the CPU 101 searches for an information package including the same item of information as the changed specified information 800 (step S219), and returns to the process in step S201.

If there is no input from the triangle button ("No" at step S215), the CPU 101 determines whether there is an input from the circle button of the input device 104 (step S220). If there is an input from the circle button ("Yes" at step S220), the CPU 101 carries out a process according to the present specified information 800. Since the execution of a process in accordance with the specified information does not have a direct relationship to the invention, a detailed description will be omitted. If there is no input from the circle button ("No" at step S220), the CPU 101 returns to the process in step S201.

As described heretofore, in this embodiment, the items of information that may be selected to become the specified information 800 are those items of information that relate to each other via an identical relation criterion group, which together form information packages 701 to 707 for each relation criterion. In case that specified information 800 is displayed in the center of the display device 105, items of information that are displayed on the selection axis 810 and the non-selection axes 820 to 850 are displayed in an order in which items of information having close similarity in contents are adjacent to each other. The items of information are also positioned in an information package, including the same item of information as the specified information 800, such that items of information having close similarity in contents are adjacent to each other.

This embodiment is the same as the first embodiment in the aspect that the specified information 800 is sequentially changed by an input from the up or down direction keys, and the selected relation criterion is sequentially changed by an input from the left or right direction keys. Consequently, in this embodiment too, in the same way as in the first embodiment, it is possible to obtain an advantageous effect in that the user can easily reach a desired item of information by visual perception from among a plurality of items of information intricately related to each other. Furthermore, the same advantageous effect as that of the first embodiment can also be obtained in recording and bookmarking a selection condition history of the specified information 800 and selected relation criterion. Further still, the same advantageous effect as that of the first embodiment can also be obtained in that an item of information having close similarity in contents to the specified information 800 is displayed close to the specified information 800, and in that the specified information 800 is displayed largest and, of other items of information, items of information adjacent to the specified information 800 are displayed large. In other words, the size with which an item is displayed is a function of the item's similarity to the specified information 800, such that the larger the displayed item, the more similar the item is to the specified information.

Meanwhile, in this embodiment, in case the information A is set as the specified information 800 (as shown, for example, in FIG. 8A), three information packages 701, 703 and 705 are searched for as information packages including the information A (as shown, for example, in FIG. 7), thus the number of non-selection axes is two (for example, 820 and 850 in FIG. 8A). Also, in case the information B is set as the specified information 800 (as shown, for example, in FIG. 8B), four information packages 701, 702, 703 and 706 are searched for as information packages including the information B (FIG. 7), thus the number of non-selection axes is three (for example, 820, 830 and 850 in FIG. 8B). In this way, non-selection axes are provided according to a number of information packages including the specified information 800, and other items of information are displayed on respective non-selection axes for each relation criterion other than the selected relation criterion. By this means, even though the number of information packages that include the selected specified information 800 may be different, other items of information, related to the present specified information 800 by other relation criteria, other than the selected relation criterion, can be perceived for each relation criterion.

Also, in case the number of information packages including an item of information selected as the specified information 800 is one, no information is displayed on the non-selection axes 820 to 850. In this case, other items of information relating to the specified information 800, with the one information package serving as the selected relation criterion, are displayed on the selection axis 810. By this means, it becomes easier for the user to visually comprehend that specified information 800 selected at the present time is related to the other items of information by only one relation criterion.

Third Embodiment

A configuration of an information processing apparatus applied to this embodiment is also the same as that of the information processing apparatus shown in the first embodiment. In this embodiment, a configuration of information selectively displayed on the display device 105 in response to an input from the input device differs from that of the first and second embodiments. This embodiment is different in information configuration, but is the same as the second embodiment in that a number of axes on which items of information are displayed is based on specified information displayed in the center of the display device 105, which changes in accordance with the specified information.

Figure 10:
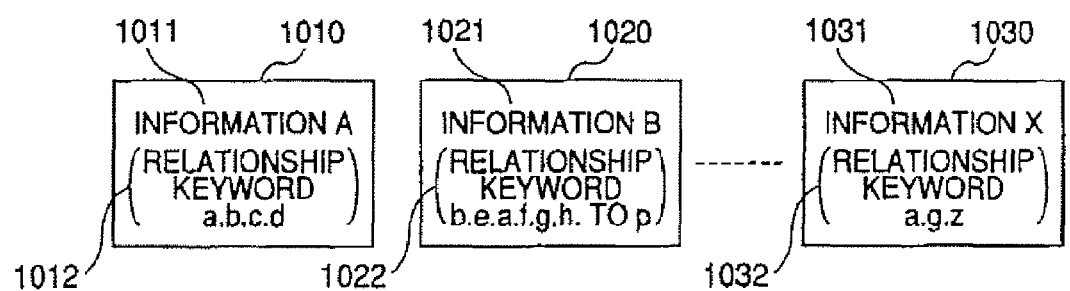
FIG. 10 is a diagram schematically showing a configuration of information selectively displayed on a display device according to a third embodiment of the invention.

FIG. 10 is a diagram schematically showing a configuration of information selectively displayed on the display device 105 in this embodiment. At this point, items of information 1010, 1020, . . . and 1030 are individually stored in the HDD 103 of the information processing apparatus in FIG. 1. The items of information 1010, 1020, . . . and 1030 include, in addition to information contents 1011, 1021, . . . and 1031 as their respective main bodies, relationship keywords 1012, 1022, . . . and 1032.

Items of information including the same keywords as the relationship keywords 1012, 1022, . . . and 1032 become items of information related to each other by the same relation criterion. For example, as the items of information 1010, 1020 and 1030 all include a keyword a, they become items of information related to each other by the keyword a. Also, the items of information 1010 and 1020 include a keyword b, but the information 1030 does not include the keyword b. Consequently, the information 1010 relates to the information 1020 via the keyword b, but does not relate to the information 1030.

Figure 11:
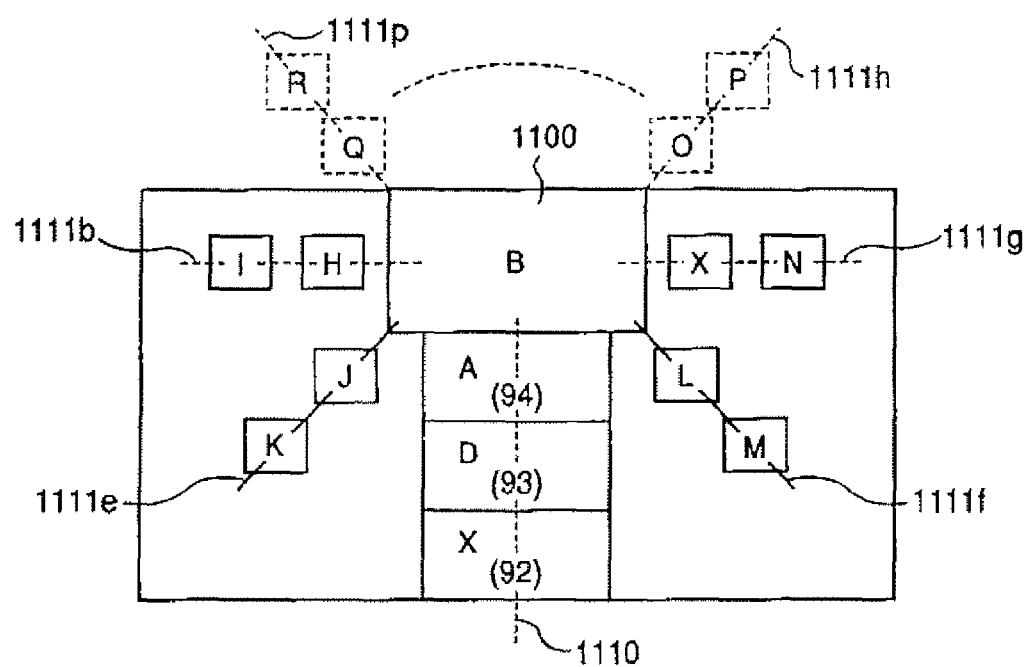
FIG. 11 is a diagram showing an example of the information selectively displayed on the display device according to the third embodiment of the invention.

Next, a description will be given of a display mode of information on the display device 105 in this embodiment. FIG. 11 is a diagram showing an example of a display mode of information selectively displayed on the display device 105 in this embodiment. In FIG. 11, information displayed large in an upper portion of the display device 105 is specified information 1100. One of relationship keywords including information selected as the specified information 1100 is selected as a selected relation criterion.

Other items of information relating to the specified information 1100 via the selected relation criterion (that is, other items of information including a keyword selected as the selected relation criterion) are displayed aligned on a selection axis 1110. In FIG. 11, items of information A, D and X are aligned on the selection axis 1110. The higher in score an item of information (such as, for example, 94, 93 and 92 for the items of information A, D and X, respectively) the closer it is displayed to the specified information 1100. The score is calculated as a function of the similarity in content of an item of information to the specified information 1100. Further, items of information (in this non-limiting example, up to three items of information whose scores have been calculated by similarity in contents to the specified information 100) are displayed in descending order on the selection axis 1110 on the display device 105. To calculate the scores, various kinds of techniques may be used, such as, for example, identicalness of words included in information, which have been conventionally used.

Other items of information relating to the specified information 1100 via other relation criteria, other than the selected relation criterion (that is, other items of information including another keyword included in the specified information 1100, other than the keyword selected as the selected relation criterion), are displayed aligned on non-selection axes for each relation criterion. The items of information aligned on the non-selection axes are displayed smaller than the items of information aligned on the selection axis 1110. On a non-selection axis 1111*b*, information H, which is higher in score calculated by similarity in information contents to the specified information 1100, is displayed closer to the specified information 1100 than information I, which is lower in the score. The same also applies to items of information aligned on non-selection axes 1111*e* to 1111*p*.

However, in case the specified information 1100 includes six or more keywords, only two keywords before and two keywords after (in a circulating sense) a keyword selected as the selected relation criterion become relation criteria to be displayed in a display area on the display device 104. The items of information relating to the specified information 1100 via each of the relation criteria are displayed on the non-selection axes 1111*b* to 1111*g*. Other items of information that include the other keywords are hypothetically displayed outside the display area, outside the visible field of the display 105. In case that the specified information 1100 includes only a single keyword, the keyword itself is selected as the selected relation criterion and items of information are displayed aligned on the selection axis 1110. In this case, no information is displayed on the non-selection axes 1111*b* to 1111*p*.

For example, in FIG. 11, keywords b, e, f and g are selected as keywords corresponding to other relation criteria, other than the selected relation criterion, and displayed on the display device 105. Other items of information O and P, relating to the specified information 1100 via a keyword h, corresponding to a relation criterion that has not been selected are also aligned on the non-selection axis 1111*h*, in the same way as the items of information aligned on the non-selection axis 1111*b*. However, the items of information O and P that are aligned on the non-selection axis 1111*h* are not displayed in the display area of the display device 105. The same also applies to other items of information Q and R, which relate to the specified information 1100 via a keyword p and are aligned on the non-selection axis 1111*p*.

In case that there is an input from the up direction key of the input device 104, items of information aligned on the selection axis 1110 move up by one, thereby changing the specified information 1100. For example, when there is an input from the up direction key in the condition in FIG. 11, the information A becomes the specified information 1100 in place of the information B. In this embodiment, as no information is displayed in an area above the specified information 1100 on the selection axis 1110, an input from the down direction key is cancelled.

Also, in case that there is an input from the left and right direction keys of the input device 104, a keyword to become the selected relation criterion is changed according to the input. For example, in case that there is an input from the left direction key in the example shown in FIG. 11, the keyword f, which is a relation criterion of the non-selection axis 1111*f*, becomes the selected relation criterion. In this case, items of information including the keyword f, besides the information B, are displayed aligned on the selection axis 1110. With this, the keyword a becomes a relation criterion other than the selected relation criterion, and a non-selection axis corresponding to the keyword a is set in a position of the non-selection axis 1111e in FIG. 11, in which items of information including the keyword a besides the information B are displayed aligned. Furthermore, positions of the non-selection axes 1111e, 1111b, 1111p, . . . , 1111h and 1111g also move and, for example, the non-selection axes 1111e, 1111b, 1111h and 1111g move respectively to the positions of 1111b, 1111p, 1111g and 1111f in FIG. 11. Also in case that there is an input from the right direction key, the same applies to the case in which there is an input from the left direction key, except only that the direction of movement is inverted.

This embodiment is the same as the first embodiment in that the selection axis 1110 and the non-selection axes 1111b to 1111p need only be recognized by the user, and need not be recognized by the CPU 101. Furthermore, this embodiment is also the same as the first embodiment in that, each time the specified information 1100 or the selected relation criterion changes, the history is stored, and the previous display mode is returned by an input from the X-button of the input device 104+. This embodiment is also the same as the first embodiment in that the specified information 1100 and the selected relation criterion are bookmarked by an input from the square button, and the bookmarked display mode is restored by an input from the triangle button. This embodiment is also the same as the first embodiment in that a process corresponding to the specified information 1100 is executed by an input from the circle button.

Also, in case that the specified information 1100 is changed by an input from the up direction key or an input from the X-button or the triangle button, other items of information, including another keyword, other than a keyword selected as the selected relation criterion, of keywords included in new specified information 1100, are retrieved for each relation criterion (that is, for each keyword). Then, scores of similarity in contents to the new specified information 1100 are calculated for the other items of information retrieved, and an order in which the items of information are displayed on the non-selection axes 1111b to 1111p is decided according to the calculated scores.

Figure 12:
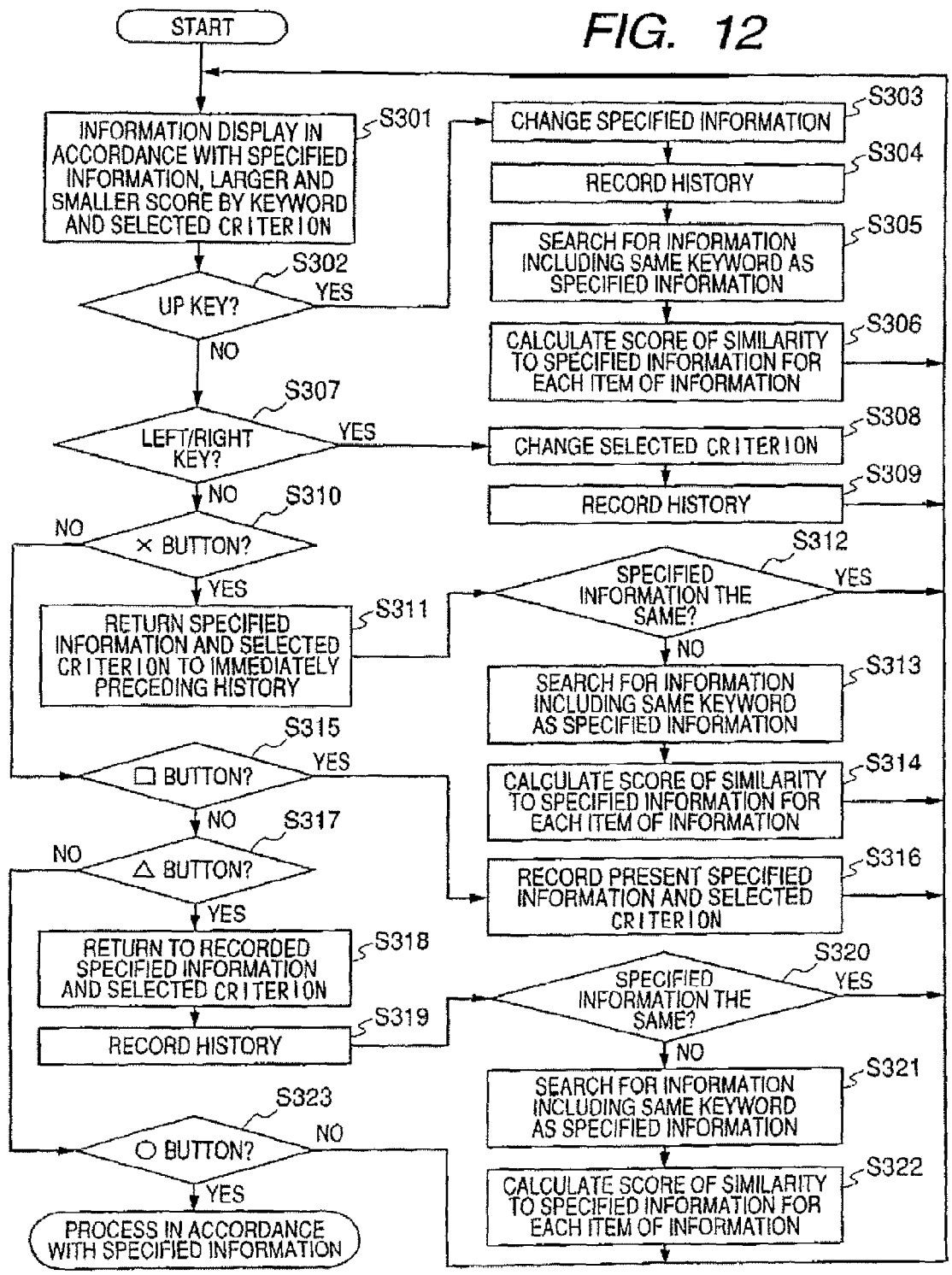
FIG. 12 is a flowchart showing a process according to the third embodiment of the invention.

Hereafter, a description will be given of a process executed in the information processing apparatus according to this embodiment. FIG. 12 is a flowchart showing the process in this embodiment. Although other processes, other than the process shown here, are carried out in the information processing apparatus as the skilled artisan will readily appreciate and recognize, an exemplary and non-limiting process minimally necessary for describing the invention will be shown here.

First, in the information processing apparatus, the CPU 101 reads specified information stored in the specified information area 401a from a history storage area indicated by the pointer 410 among a plurality of history storage areas 401 to 40n in the history buffer 400 provided in the main memory 102 (as shown, for example, in FIG. 4A). The CPU 101 also reads a selected relation criterion (here, a keyword) stored in the selection criterion area 401b. Then, the CPU 101 displays information on the display device 105 in accordance with a value of the scores of similarity in contents to the specified information and with the selected relation criterion (step S301).

Next, the CPU 101 determines whether there is an input from the up direction key of the input device 104 (step S302). If there is an input from the up direction key ("Yes" at step S302), the CPU 101, in accordance with a direction input from the direction key, changes another item of information relating to the present specified information 1100 via the selected relation criterion to the new specified information 1100 (step S303). Next, the CPU 101 stores the changed selection condition of the specified information 1100 and the selected relation criterion in a history storage area subsequent to the history storage area indicated by the pointer 410 in the history buffer 400 (shown, for example, in FIG. 4A), and moves the pointer 410 to the subsequent history storage area (step S304). The CPU 101 searches for items of information that included the same keywords as those of the changed specified information 1100 for each of the keywords (step S305). Then, the CPU 101 calculates a score of similarity in contents to the specified information 1100 for each of the items of information searched out (step S306) and returns to the process in step S301.

If there is no input from the up direction key ("No" at step "S302), the CPU 101 determines whether there is an input from the left or right direction keys of the input device 104 (step S307). If there is an input from the left or right direction keys ("Yes" at step S307), the CPU 101, in accordance with the direction input from the direction key, changes a keyword to serve as the selected relation criterion to another keyword included in the present specified information 1100 (step S308). Next, the CPU 101 stores the selection condition of the specified information 1100 and the new selected relation criterion in a history storage area subsequent to the history storage area indicated by the pointer 410 in the history buffer 400, and moves the pointer 410 to the subsequent history storage area (step S309). Then, the CPU 101 returns to the process in step S301.

If there is no input from the left or right direction keys ("No" at step S307), the CPU 101 determines whether there is an input from the X-button of the input device 104 (step S310). If there is an input from the X-button ("Yes" at step S310), the CPU 101 returns the pointer 410 to a history storage area immediately previous to the history storage area indicated by the pointer 410 in the history buffer 400 provided in the main memory 102. By returning the pointer 410 to the previous history storage area, the display mode of the display device 105 is returned to the previous condition in history (step S311).

The CPU 101 determines whether the specified information to be changed is the same as the changed specified information (step S312). If they are the same ("Yes" at step S312), the CPU 101 returns to the process in step S301. On the other hand, if the items of information are not the same ("No" at step S312), the CPU 101 searches for items of information that include the same keywords as those of the changed specified information 1100, and this search is conducted for each keyword (step S313). Then, the CPU 101 calculates a score of similarity in contents to the specified information 1100 for each of the items of information found (step S314), and returns to the process of step S301.

If there is no input from the X-button ("No" at step S310), the CPU 101 determines whether there is an input from the square button of the input device 104 (step S315). If there is an input from the square button ("Yes" at step S315), the CPU 101 stores an item of information, which is selected as the specified information 1100 at the present time in the specified information area 420a, in the bookmark buffer 420 (shown, for example, in FIG. 4B) provided in the main memory 102. The CPU 101 also stores a relation criterion, which is selected as the selected relation criterion at the present time, in the selection criterion area 420b (step S316). Then, the CPU 101 returns to the process in step S301.

If there is no input from the square button ("No" at step S315), the CPU 101 determines whether there is an input from the triangle button of the input device 104 (step S317). If there is an input from the triangle button ("Yes" at step S317), the CPU 101 reads specified information stored in the specified information area 420*a* in the bookmark buffer 420 and a selected relation criterion stored in the selection criterion area 420*b*, and makes a change to the read specified information and selected relation criterion (step S318). Next, the CPU 101 stores the changed selection condition of the specified information 1100 and the selected relation criterion in a history storage area subsequent to the history storage area indicated by the pointer 410 in the history buffer 400, and moves the pointer 410 to the subsequent history storage area (step S319).

The CPU 101 determines whether the specified information to be changed is the same as the changed specified information (step S320). If they are the same ("Yes" at step S320), the CPU 101 returns to the process in step S301. On the other hand, if the items of information are not the same ("No" at step S320), the CPU 101 searches for items of information that include the same keywords as those of the changed specified information 1100, executing the search for each keyword (step S321). Then, the CPU 101 calculates a score of similarity in contents to the specified information 1100 for each of the items of information found (step S322), and returns to the process in step S301.

If there is no input from the triangle button ("No" at step S317), the CPU 101 determines whether there is an input from the circle button of the input device 104 (step S323). If there is an input from the circle button ("Yes" at step S323), the CPU 101 carries out a process according to the present specified information 1100. As this process has no direct relationship to the invention, a detailed description will be omitted. If there is no input from the circle button ("No" at step S323), the CPU 101 returns to the process in step S301.

As described heretofore, in the third embodiment, the specified information 1100 is displayed in an upper portion of the display device 105 and, of the items of information including the same keywords as those of this specified information, items of information having close similarity to the specified information 1100 are displayed close to the specified information 1100. At this point, taking the case in FIG. 11 as an example, for each of the keywords b, e, a, f, g, h, . . . and p included in the information B, which is to become the specified information 1100, items of information including the keywords are searched for. Of the keywords of the information B, which may be selected to become the specified information 1100, the keyword a is selected as the selected relation criterion, and items of information including the keyword a are displayed aligned on the selection axis 1110. The other keywords b, e, f, g, h, and p are other relation criteria, other than the selected relation criterion, and items of information including these keywords are displayed aligned on the non-selection axes 1111*b* to 1111*p*.

At this point, items of information, besides the specified information 1100, including the keyword a selected as the selected relation criterion (for example, in FIG. 11, items of information A, D and X) are displayed larger than items of information, other than the specified information 1100, including the keywords b, e, f, g, h, . . . and p, which are other relation criteria, other than the selected relation criterion. Thus, it becomes easier for the user to visually perceive whether an item of information is one which can be made the new information 1100 by simply actuating the up direction key, or one which cannot be changed to the new specified information 1100 unless an input from the up direction key is carried out after an input from the left and right direction keys.

Also, among keywords included in the information B, which may be selected to become the specified information 1100, there are some keywords, such as the keyword b, for which the items of information relating to the specified information 1100 are displayed in the display area of the display device 105 as being aligned on the non-selection axis 1111*b*. On the other hand, there are some other keywords, such as the keyword p, for which items of information related to the specified information 1100 are not displayed in the display area of the display device 105 after an input from the left or right direction keys. By limiting a number of keywords for which the related items of information are displayed in this way, even though a large number of keywords may be included in the specified information 1100, a display size of other items of information, other than the specified information 1100, may be prevented from becoming too small on the display device 105. Also, even though the number of keywords for which the related items of information are displayed is limited, as long as a fixed number of items of information are displayed, the user is not greatly hindered from visually perceiving a relationship between the other items of information and the specified information 1100.

Also, the items of information that are not displayed on the display device 105 at a certain point may be displayed on the display device 105 by repeating an operation of the up, down, left and/or right direction keys of the input device 104, such as, for example, items of information having a low score of similarity in contents to the information B, which is to become the specified information 1100, or items of information including the keyword p. Thus, the user is able to visually evaluate items of information relating to the specified information 1100, even the items of information that are not displayed on the display device 105 at a certain point, so that they should be eventually displayed on the display device 105.

Also, which of the items of information including the same relationship keyword are to be displayed in a close position to the specified information 1100 is decided based upon a value of a score calculated based on similarity in contents of the items of information to contents of the specified information 1100. In this way, even among items of information including the same keyword, that is, items of information related to the specified information 1100 by the same relation criterion, by displaying items of information having a closer relationship to the specified information 1100 closer to the specified information 1100, it becomes easier for the user to visually perceive a relationship between the present specified information 1100 and other items of information.

Meanwhile, a score of similarity in contents to the specified information 1100 is calculated when an item of information, which is to become the specified information 1100, is newly set. For this reason, which of the items of information are to be displayed in a close position to the specified information 1100 on the selection axis 1110 is updated continuously, and the items of information that are optimal at any instant in time are displayed in a position easy for the user to visually evaluate.

Furthermore, this embodiment is the same as the first embodiment in that the specified information 1100 is sequentially changed by an input from the up direction key, and the selected relation criterion is sequentially changed by an input from the left or right direction keys. Consequently, in this embodiment too, in the same way as in the first embodiment, an advantageous effect can be obtained in which, from among a plurality of items of information complicatedly relating to each other, the user can easily reach a desired item of information by visual perception. Further still, regarding a history recording and a bookmarking of the selection condition of the specified information 1100 and the selected relation criterion, it is possible to obtain the same advantageous effect as that of the first embodiment.

Modified Examples of Embodiments

The invention, without being limited to the first to third embodiments, can be modified and applied in various ways. Hereafter, a description will be given of modified aspects of the first to third embodiments of the invention.

A number of items of information displayed on the selection axes 310, 810 and 1110 and the non-selection axes 320, 330, 820 to 850 and 1111b to 1111p, which have been shown in the first to third embodiments, is not limited to the number shown in each embodiment and, as long as it includes the items of specified information 300, 800, 1100 and at least one of the items of information relating to the items of specified information 300, 800, 1100 via each of the relation criteria. Also, a number of items of information displayed aligned on the selection axes 310, 810 and 1110 and the non-selection axes 320, 330, 820 to 850 and 1111b to 1111p may be set by a user's operation of the input device 104. In this case, the user can select a display mode that is easy for the user to visually comprehend according to contents displayed on the display device 105.

Also, the number of items of information displayed on each axis may be changed by a control of the CPU 101. In this case, by controlling the CPU 101 to decide an optimum number of items of information to be displayed according to a display mode displayed on the display area or the display device 105, it becomes easier for the user to visually perceive items of information displayed on the display device 105, and to more easily carry out information selection and/or retrieval.

Also, in the first and second embodiments too, in the same way as in the third embodiment, on the display device 105, the number of items of information displayed on the selection axes 310, 810 and 1110 may be larger than the number of items of information displayed on the non-selection axes 320, 330, 820 to 850 and 1111b to 1111p. In this way, by making the number of items of information on the selection axes 310, 810 and 1110 larger than the number of items of information on the non-selection axes 320, 330, 820 to 850 and 1111b to 1111p, it becomes easier to perceive other items of information that can be selected as the new specified information 300, 800, 1100 by only an input from the up and/or down direction keys of the input device 104.

In case that three or more items of information, besides the specified information 300, 800, 1100, are displayed aligned in the same direction (for example, here, up and down are considered to be different directions) on one axis, the closer relationship to the specified information 300, 800, 1100 an item of information has, as well as it being displayed closer to the specified information 300, 800, 1100, the larger it may be displayed. For example, with regard to the items of information A, D and X aligned on the selection axis 1110 in FIG. 11, not only are they displayed close to the specified information 1100 in the order named in a descending order of similarity in contents to the specified information 1100, but they may be also displayed in a size which decreases in that order. For example, the information A can be displayed larger than the information D, and the information D can be displayed larger than the information X. With such a configuration, it becomes easier for the user to visually perceive a relationship between the specified information 300, 800, 1100 and other items of information. Thus, it also becomes easier for the user to visually comprehend how to select new specified information in order to reach a user's desired item of information from the present specified information 300, 800, 1100.

In the first to third embodiments, each time the specified information 300, 800, 1100 and/or the selected relation criterion is changed, a new selection condition of the specified information 300, 800, 1100 and selected relation criterion is stored in the history storage areas 401 to 40n. However, besides the case in which the bookmarked display mode is restored, as a past selection condition of the specified information and/or selected relation criterion can be specified even by an input history of the up, down, left and/or right direction keys from the input device 104, the input history of the up, down, left and/or right direction keys may be stored in the history storage areas 401 to 40n.

In the first to third embodiments, only one bookmark buffer 420 is provided in the main memory 102, but a plurality of bookmark buffers may be provided. In this case, a bookmark buffer may be preferably configured of a ring buffer including a plurality of bookmark areas, and each of the bookmark areas includes a specified information area and a selected criterion area. Then, a pointer is provided. In this case, a control executed when there is an input from the square button and the triangle button changes in the following way from that in the first to third embodiments.

When the user carries out an input from the square button of the input device 104, in a bookmark area subsequent to a bookmark area indicated by the pointer, information selected as the specified information 300, 800, 1100 at that instant in time is recorded in the specified information area. At the same time, a relation criterion selected as the selected relation criterion at that time is recorded in the selected criterion area. Then, the pointer moves to the subsequent bookmark area.

When the user actuates the triangle button of the input device 104, the specified information recorded in the specified information area of the bookmark area indicated by the pointer and a relation criterion recorded in the selected criterion area are read. Then, the bookmarked display mode is restored and the read-out specified information and relation criterion are recorded as a new selection condition of the specified information 300, 800, 1100 and the selected relation criterion in the history storage area. With this, the pointer of the bookmark buffer is returned to the previous bookmark area. Accordingly, when there are two successive inputs from the triangle button, the display mode corresponding to the specified information and the selected relation criterion bookmarked the time before last is restored. In case that the plurality of bookmark areas are provided in this way, not only an input to return the pointer (for example, here, an input by the triangle button), but also an input to advance the pointer may be provided.

In the first to third embodiments, at the time of actuation of the square button of the input device 104, in the event that there is data registered in the bookmark buffer 420 by an operation of the square button prior to an operation of the square button at this time, the data registered by the input from the square button at this time is overwritten. However, the invention is not limited to this configuration, and the user may be inquired as to whether to overwrite data. In this case, in case that there is already data registered in the bookmark buffer 420 at the time of an input from the square button, a screen, in which one of "overwrite data as it is?" (bookmark present display mode), "display past bookmark?" (bookmark present display mode) and "do not overwrite" may be selected by an input from the circle button, and may be preferably displayed on the display device 105, thereby enabling a selection by a user's decision.

With such a configuration, even when bookmarking a newly intriguing selection condition of the specified information 300, 800, 1100 and selected relation criterion by an input from the square button, it becomes possible for the user to confirm a selection condition of the specified information and the selected relation criterion about which the user became curious at a certain point in the past. Thus, the situation where a selection condition of the specified information and the selected relation criterion, which should have been bookmarked, cannot be restored without being noticed, thereby it becomes easier for the user to select a desired item of information.

In the first to third embodiments, a difference between items of information displayed on the display device 105 can be evaluated by changing a display size and a display position, but the invention is not limited to this configuration. For example, items of information, which are displayed in positions more distant from the specified information 300, 800, 1100, may be more suppressed in pictorial aspects such as, for example, a color, a tone and a resolution. In case that moving information such as an animation is applied as display information, it is also acceptable to configure the information display and selection in such a way that information displayed in a position more distant from the specified information 300, 800, 1100 is more slowly reproduced. Otherwise, it is also acceptable to configure the display and selection in such a way that items of information other than the specified information 300, 800, 1100 are stationary. It is also acceptable to configure the display and selection in such a way that a setting of a display condition of these items of information can be switched by a user's operation. In this case, it becomes possible for the user to select items of information in a desired display condition, and it becomes easier to select a desired item of information.

In the first to third embodiments, any of the specified information, other items of information relating to the specified information via the selected relation criterion, and other items of information relating to the specified information via other relation criteria, other than the selected relation criterion, are constantly displayed on the display device 105. However, only an item of information selected as the specified information at the present time may be displayed on the display device 105, while other items of information may be displayed on the display device 105 as necessary.

Figure 13A:
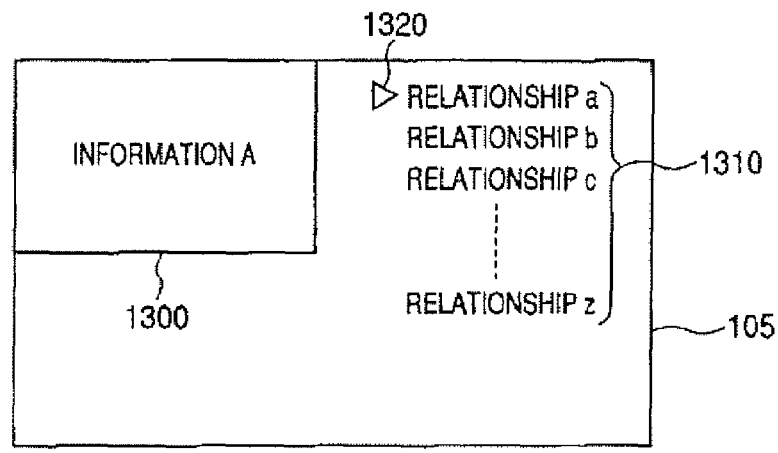
FIGS. 13A to 13C are diagrams showing modified examples of the display mode of the information selectively displayed on the display device.
Figure 13B:
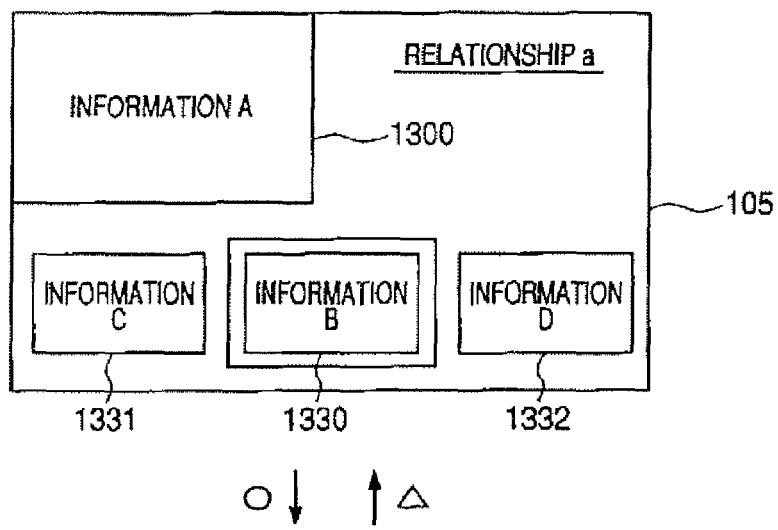
Figure 13C:
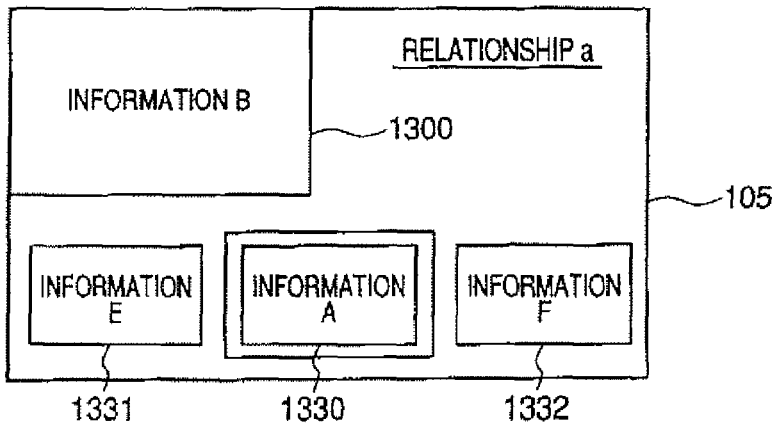

FIGS. 13A to 13C are diagrams showing modified examples of a display mode of information selectively displayed on the display device 105. As shown in FIG. 13A, specified information 1300 (here, information A) and a relation criterion 1310 (here, for example, a relationship a to a relationship z), which relates the information A servings as the specified information 1300 to other items of information, are displayed on the display device 105. By operating the up or down direction keys of the input device 104 and moving a cursor 1320, any relation criterion can be selected from among the relationship a to the relationship z. In the example shown in FIG. 13A, an input from the left or right direction keys is cancelled.

When, for example, an input from the circle button of the input device 104 is carried out in the non-limiting example of FIG. 13A, as shown in FIG. 13B, with the information A remaining displayed as the specified information 1300, items of information B, C and D, relating to the information A via the relationship a, are displayed as items of information 1330 to 1332 relating to the specified information 1300. The information 1330 in the center is information to be selected next as the specified information 1300 in response to an input from the circle button of the input device 104.

When the left or right direction keys of the input device 104 are operated in the non-limiting example of FIG. 13B, the information contents of the information 1330, which is to be selected next as the specified information, and the items of information 1331 and 1332 adjacent to the information 1330 are changed in accordance with the input. For example, when an input is carried out from the right direction key, the information 1330 to be selected next as the specified information is changed to the information C. When, for example, an input from the X-button of the input device 104 is carried out in the example of FIG. 13B, the information display mode of the display device 105 can be returned to the exemplary non-limiting display configuration shown in FIG. 13A.

When an input from the circle button of the input device 104 is carried out in the exemplary configuration of FIG. 13B, as shown in FIG. 13C, the information B serving as the information 1330 is changed to the specified information 1300, and the information A serving as the specified information 1300 is changed to the information 1330 to be selected next as the specified information. Also, the information contents of the items of information 1331 and 1332 may also be changed along with this change. When, for example, an input from the triangle button of the input device 104 is carried out in the condition of FIG. 13C, the information display mode of the display device 105 can be returned to the condition shown in FIG. 13B. Also, when, for example, an input from the X-button of the input device 104 is carried out in the example shown in FIG. 13C, the specified information 1300 (here, for example, the information B) and the relation criterion 1310 (here, for example, the relation criterion which relates the information B to other items of information), which are same as those shown in FIG. 13A, are displayed on the display device 105.

In the first to third embodiments, items of information to be displayed on the display device 105 are stored in advance in the HDD 103. However, items of information to be displayed on the display device 105 may be, for example, an electronic program guide (EPG), which are stored in a server device existing on the Internet, a local area network (LAN), a wide area network (WAN), or the like, and wherein the various components are coupled wirelessly or through wired configurations, as the skilled artisan will readily recognize. Also, the items of information may be stored dispersed on a plurality of server devices. At this point, in the third embodiment, they can be stored dispersed for each of the items of information 1010, 1020, ... and 1030 but, in the second embodiment, they can be stored dispersed for each of the information packages 701 to 707.

Also, when searching for information as in the second and third embodiments, information indicating the changed specified information 800, 1100 may be transmitted from the communication device 106 to the server device on the Internet using a function included in the server device, each time the specified information 800, 1100 is changed, and other items of information to be displayed (which, in the third embodiment, also include items of information lying outside the display area) may be received from the server device. When only the selected relation criterion changes, as no change occurs in the type of the information to be displayed, it is not necessary to receive information from the server device.

In the case that information existing on the Internet is applied as the information to be displayed in this way, information that can be displayed on the display device 105 may be limited for each information processing apparatus or for each user. In this case, the information that can be displayed may be limited by the information processing apparatus, or it may be limited by the server device. In this case, display information to be displayed on the display device 105 may be limited by a user's age, a presence or absence of registration in a system, or the like.

In the first to third embodiments, the specified information 300, 800, 1100 is sequentially changed by an operation of the input device 104. However, explanation has not been made as to which information is first selected as the specified information 300, 800, 1100. The first specified information 300, 800, 1100 may be appropriately selected in the information processing apparatus, or may be selected in accordance with a user's instruction depending upon a configuration of the information to be displayed on the display device 105. In order to select the first specified information, for example, it is possible to use the electronic program guide.

Figures 14A, 14B:
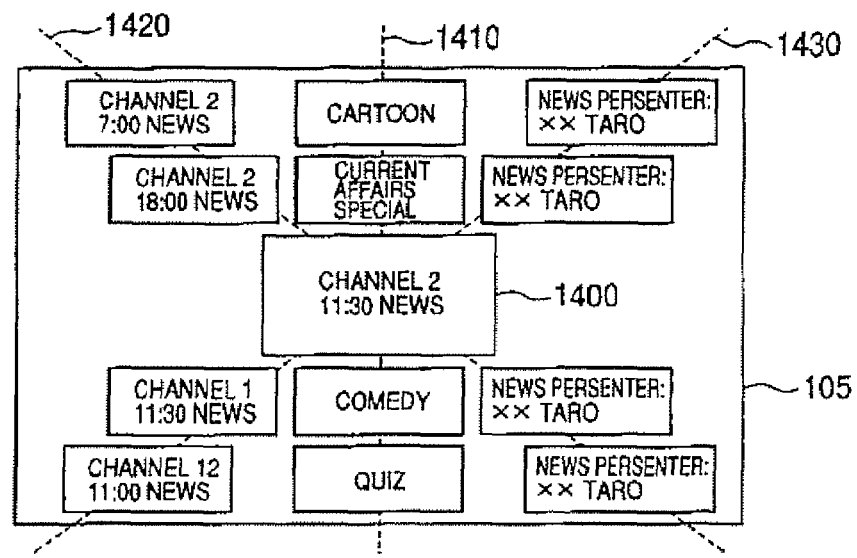
FIGS. 14A and 14B are diagrams showing an example of an electronic program guide and an example of a display mode of information displayed on the display device in accordance with specified information selected first in accordance with the electronic program guide.

FIG. 14A is a diagram showing an example of the electronic program guide. As shown in the figure, in the electronic program guide, channels are set on its horizontal axis and hours are set on its vertical axis, and programs are displayed in a list format on a per channel and hour basis. In order to select the first specified information in accordance with the electronic program guide, first, the electronic program guide is displayed on the display device 105.

In the electronic program guide, the channel is changed by operating the left or right direction keys of the input device 104, and the hour is changed by operating the up or down direction keys. For example, in the non-limiting example shown in FIG. 14A, 11:30 news on channel 2 is selected (for example, shown in the figure by the shaded area). At this point, when the left direction key is operated, 11:30 news on channel 1 is selected and, when the up direction key is operated, a 10:30 current affairs special on channel 2 is selected. For example, when the user operates the circle button of the input device 104, the selected program becomes the first specified information.

FIG. 14B is a diagram showing an example of a display mode of information on the display device 105 in a case in which the 11:30 news on channel 2 is set as the first specified information. In this case, the 11:30 news on channel 2 is displayed in the center of the display device 105 as specified information 1400. Also, other programs relating to each other via the same relationship of the channel 2 are displayed aligned on a selection axis 1410. Other programs relating to each other via the same relationship of news are displayed aligned on a selection axis 1420. Other programs relating to each other via the same relationship of a news presenter XX Taro are displayed aligned on a selection axis 1430.

With such a configuration, from among items of information displayed in a list (here, individual programs), a desired item of information is selected as an item of information to become the first specified information, it becomes possible to more easily reach a user's desired item of information.

In the first to third embodiments, information relating to items of information is not displayed on the display device 105, but information as to which relation criterion is made the selected relation criterion with respect to the specified information 300, 800, 1100 may be displayed. Also, the number of items of information relating to the specified information 300, 800, 1100 via the relevant selected relation criterion may be displayed. In this case, the user can change the display condition while noting the number of items of information aligned on the selection axis 310, 810, 1110.

In the first to third embodiments, the four keys, that is, up, down, left and right keys are provided as the direction input keys of the input device 104. However, a component device of the input device 104 necessary for carrying out a direction input is not limited to this configuration. As long as a key, like a direction key, is provided for giving an instruction to make a transition of the specified information 300, 800, 1100 or the selected relation criterion, a joystick, a mouse, a track ball or the like may be applied. Also, information that is to become the specified information 300, 800, 1100 may be directly indicated through devices such as, for example a touch panel, a biometrics device, or the like. The input device 104 may not necessarily be included in a main body of the information processing apparatus, but may instead be a remote device such as, for example a remote controller, or the like.

In the first to third embodiments, information selectively displayed on the display device 105 and a program executed by the CPU 101 are stored in the HDD 103, but the invention is not limited to this configuration. The information and the program may be downloaded from a server device via a network through the communication device 106 and stored in the main memory 102. Also, it is possible to provide an information processing apparatus having the information and the program stored in advance in the main memory 102. In addition, it is possible to distribute the information and the program by various methods according to hardware applied as a platform.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and are not drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A display information selection apparatus for selectively displaying a plurality of items of information on a display in accordance with an input from an input device including at least a first input and a second input, each of the plurality of items of information relating to a specified item of information via at least one of a selected relation criterion and a non-selected relation criterion, the apparatus comprising:
a specified information displayer that displays the specified item of information in a predetermined position on the display, the specified item of information being selected from among the plurality of items of information;
a selectable information displayer that displays selectable items of information relating to the specified item of information via the selected relation criterion, the selectable items of information being determined from among the plurality of items of information other than the specified item of information and aligned on a selection axis set on the display with the predetermined position as a reference;
a non-selectable information displayer that displays non-selectable items of information relating to the specified item of information via the non-selected relation criterion, the non-selectable items of information being determined from among the plurality of items of information other than the specified item of information and aligned on a non-selection axis set on the display beside the selection axis with the predetermined position as a reference;
a specified information changer that changes the specified item of information to another of the plurality of items of information displayed adjacent to the specified item of information on the selection axis in accordance with the first input; and
a selected criterion changer that changes the selected relation criterion in accordance with the second input.

2. The display information selection apparatus according to claim 1, wherein the specified information displayer displays the specified item of information larger than the selectable items of information and the non-selectable items of information.

3. The display information selection apparatus according to claim 1, wherein the selectable information displayer displays the selectable items of information relating to the specified item of information via the selected relation criterion larger than the non-selectable items of information relating to the specified item of information via the non-selected relation criterion.

4. The display information selection apparatus according to claim 1, wherein the selectable information displayer displays the selectable items of information that are displayed adjacent to the specified item of information larger than the selectable items of information that are not displayed adjacent to the specified item of information.

5. The display information selection apparatus according to claim 1, wherein the selectable information displayer displays the one of the selectable items of information having a closest similarity to the specified item of information adjacent to the specified item of information.

6. The display information selection apparatus according to claim 1, wherein the selectable information displayer displays a predetermined number of the selectable items of information, from among the plurality of items of information relating to the specified item of information via the selected relation criterion, aligned on the selection axis.

7. The display information selection apparatus according to claim 6, wherein the non-selectable information displayer displays a predetermined number of the non-selectable items of information, from among the plurality of items of information relating to the specified item of information via the non-selected relation criterion, aligned on the non-selection axis.

8. The display information selection apparatus according to claim 1, wherein
a plurality of the non-selected relation criterion relate the plurality of items of information to respective different ones of the plurality of items of information, and
the non-selectable information displayer includes:
a non-selection axis setter that sets a non-selection axis for each of the non-selected relation criterion in accordance with a number of the non-selected relation criterion relating the specified item of information to the non-selectable items of information; and
a relation-criterion-based displayer that displays the non-selectable items of information relating to the specified item of information via a plurality of the non-selected relation criterion side-by-side on the non-selection axis set for each of the non-selected relation criterion.

9. The display information selection apparatus according to claim 8, wherein
the plurality of items of information includes an item of information having a single relation criterion relating the other of the plurality of items of information thereto, and
the non-selectable information displayer displays the non-selectable items of information relating to the specified item of information via the non-selected relation criterion when a number of the relation criteria relating the specified item of information to the other of the plurality of items of information is at least two.

10. The information selection display apparatus according to claim 1, wherein
the plurality of items of information includes an item of information having at least two non-selected relation criterion relating the others of the plurality of items of information thereto,
the non-selectable information displayer includes:
a non-selection axis setter that sets at least two non-selection axes for each of the non-selected relation criterion when a number of the non-selected relation criterion relating the specified item of information to the other items of information is at least two; and
a relation-criterion-based displayer that displays the non-selectable items of information relating to the specified item of information via the at least two non-selected relation criterion on the at least two non-selection axes set for each of the non-selected relation criterion, and wherein the selected criterion changer sequentially changes a selection of the selected relation criterion among the selected relation criterion and the at least two non-selected relation criterion in response to the second input.

11. The display information selection apparatus according to claim 1, further comprising:

a history storage that stores information identifying a selection history of the specified item of information and the selected relation criterion; and a history status restorer that changes the specified item of information and the selected relation criterion to a previously selected specified item of information and selected relation criterion.

12. The display information selection apparatus according to claim 1, wherein the input device further includes:
a selection status saving input that saves a selection status of the specified item of information and the selected relation criterion; and
a selection status restoration input that restores the saved selection status of the specified item of information and the selected relation criterion, and the display information selection apparatus further comprises:
a selection status storage that stores an item of information identifying the specified item of information and the selected relation criterion currently selected in response to the selection status saving input; and
a selection status restorer that changes the selection of the specified item of information and the selected relation criterion to the specified item of information and the selected relation criterion identified by the information stored in the selection status storage in response to the selection status restoration input.

13. The display information selection apparatus according to claim 1, wherein the first input comprises a first dimensional direction input that inputs a first two-dimensional direction,
the second input comprises a second dimensional direction input that inputs a second two-dimensional direction, and
the selectable information displayer displays the selectable items of information relating to the specified item of information via the selected relation criterion on the selection axis set in a first dimensional direction on the display.

14. The display information selection apparatus according to claim 1, wherein the input device further includes a selection confirmation input that confirms a selection of the specified item of information, and the display information selection apparatus further comprises:

a selection processor that carries out a process determined in accordance with the specified item of information in response to the selection confirmation input.

15. The display information selection apparatus according to claim 1, further comprising:

an information extractor that extracts information from an information storage that stores the plurality of items of information, each of the plurality of items of information including a plurality of items of individual information, the items of individual information corresponding to respective different ones of relation criterion, wherein the selectable information displayer causes the information extractor to extract items of information including the individual information corresponding to the selected relation criterion in common, and causes the display to display the extracted items of information aligned on the selection axis, and the non-selectable information displayer causes the information extractor to extract items of information including the individual information corresponding to the non-selected relation criterion, and causes the display to display the extracted information aligned on the non-selection axis.

16. The display information selection apparatus according to claim 1, further comprising:

an information searcher that searches an information storage for at least one of a plurality of relation criterion information sets that includes the specified item of information, each relation criterion information set being a set of a plurality of the items of information related to each other via respective different ones of relation criteria and being stored in the information storage in association with each of the relation criteria, wherein the selectable information displayer displays other items of information included in one of the relation criterion information sets corresponding to the selected relation criterion, from among the relation criterion information sets searched by the information searcher, aligned on the selection axis, and the non-selectable information displayer displays non-selectable items of information included in one of the relation criterion information sets corresponding to the non-selected relation criterion, from among the relation criterion information sets searched by the information searcher, aligned on the non-selection axis.

17. The display information selection apparatus according to claim 1, further comprising:

an information searcher that searches the information storage that stores the plurality of items of information, each of which includes relation criterion information that identifies a relation criterion relating the item of information to other items of information, for one of the items of information that includes the same relation criterion information as the relation criterion information included in the specified item of information with respect to each of the relation criteria, wherein the selectable information displayer displays items of information corresponding to the selected relation criterion searched by the information searcher aligned on the selection axis, and the non-selectable information displayer displays items of information corresponding to the non-selected relation criterion searched by the information searcher aligned on the non-selection axis.

18. A display information selection method executed in a computer apparatus comprising an input device including at least a first input and a second input and a display for displaying information, the method selectively displaying a plurality of items of information on the display in accordance with an input from the input device wherein the plurality of items of information relate to a specified item of information via at least one of a selected relation criterion and a non-selected relation criterion, the method comprising:

displaying the specified item of information in a predetermined position on the display, the specified item of information being selected from among the plurality of items of information;

displaying selectable items of information relating to the specified item of information via the selected relation criterion aligned on a selection axis set on the display with the predetermined position as a reference, the selectable items of information being determined from among the plurality of items of information other than the specified item of information;

displaying non-selectable items of information relating to the specified item of information via the non-selected relation criterion aligned on a non-selection axis set on the display beside the selection axis with the predetermined position as a reference, the non-selectable items of information being determined from among the plurality of items of information other than the specified item of information;

changing the specified item of information to another of the plurality of items of information displayed adjacent to the specified item of information on the selection axis in accordance with the first input; and changing the selected relation criterion in accordance with the second input.

19. A program that, when executed by a computer apparatus comprising an input device including at least a first input, a second input, and a display for displaying information, causes the computer apparatus to carry out a process of selectively displaying a plurality of items of information on the display in accordance with an input from the input device wherein each of the plurality of items of information is related to a specified item of information via at least one of a selected relation criterion and a non-selected relation criterion, the program causing the computer apparatus to execute:

displaying the specified item of information in a predetermined position on the display, the specified item of information being selected from among the plurality of items of information;

displaying selectable items of information relating to the specified item of information via the selected relation criterion aligned on a selection axis set on the display with the predetermined position as a reference, the selectable items of information being determined from among the plurality of items of information other than the specified item of information;

displaying non-selectable items of information relating to the specified item of information via the non-selected relation criterion aligned on a non-selection axis set on the display beside the selection axis with the predetermined position as a reference, the non-selectable items of information being determined from among the plurality of items of information other than the specified item of information;

changing the specified item of information to another of the plurality of items of information displayed adjacent to the specified item of information on the selection axis in accordance with the first input; and changing the selected relation criterion in accordance with the second input.

20. A computer readable recording medium tangibly embodying a program that, when executed by a computer apparatus comprising an input device including at least a first input, a second input, and a display for displaying information, causes the computer apparatus to carry out a process of selectively displaying a plurality of items of information on the display in accordance with an input from the input device wherein each of the plurality of items of information is related to a specified item of information via at least one of a selected relation criterion and a non-selected relation criterion, the program causing the computer apparatus to execute:

displaying the specified item of information in a predetermined position on the display, the specified item of information being selected from among the plurality of items of information;

displaying selectable items of information relating to the specified item of information via the selected relation criterion aligned on a selection axis set on the display with the predetermined position as a reference, the selectable items of information being determined from among the plurality of items of information other than the specified item of information;

displaying non-selectable items of information relating to the specified item of information via the non-selected relation criterion aligned on a non-selection axis set on the display beside the selection axis with the predetermined position as a reference, the non-selectable items of information being determined from among the plurality of items of information other than the specified item of information;

changing the specified item of information to another of the plurality of items of information displayed adjacent to the specified item of information on the selection axis in accordance with the first input; and changing the selected relation criterion in accordance with the second input.

* * * * *